US012768360B2

(12) United States Patent
Willi et al.

(10) Patent No.: US 12,768,360 B2
(45) Date of Patent: Oct. 20, 2026

(54) ELECTROMAGNETIC ROTARY DRIVE AND CENTRIFUGAL PUMP

(71) Applicant: Levitronix GmbH, Zürich (CH)

(72) Inventors: Urs Willi, Romanshorn (CH); Mario Häfliger, Kallern (CH); Natale Barletta, Zürich (CH)

(73) Assignee: Levitronix GmbH, Zürich (CH)

( * ) Notice: Subject to any disclaimer, the term of this patent is extended or adjusted under 35 U.S.C. 154(b) by 189 days.

(21) Appl. No.: 18/607,200

(22) Filed: Mar. 15, 2024

(65) Prior Publication Data

US 2024/0328423 A1 Oct. 3, 2024

(30) Foreign Application Priority Data

Apr. 3, 2023 (EP) .................................... 23166383

(51) Int. Cl.

*F04D 13/06* (2006.01)
*F04D 1/00* (2006.01)
*H02K 1/14* (2006.01)
*H02K 1/2733* (2022.01)
*H02K 9/19* (2006.01)

(52) U.S. Cl.

CPC ............... *F04D 13/06* (2013.01); *F04D 1/00* (2013.01); *H02K 1/146* (2013.01); *H02K 1/2733* (2013.01); *H02K 9/19* (2013.01); *H02K 2201/18* (2013.01)

(58) Field of Classification Search

CPC .......... H02K 1/14; H02K 1/145; H02K 1/146; H02K 1/20; H02K 3/24; H02K 9/19; H02K 2203/03; H02K 2211/03

See application file for complete search history.

(56) References Cited

U.S. PATENT DOCUMENTS

2017/0021071 A1* 1/2017 Cotter ................. A61M 60/822
2019/0231954 A1 8/2019 Cotter

FOREIGN PATENT DOCUMENTS

CN 106787302 A 5/2017
CN 206272359 U 6/2017

(Continued)

OTHER PUBLICATIONS

18607200_2025-11-13_CN_106787302_B_H.pdf (Year: 2025).*

(Continued)

*Primary Examiner* — Christopher M Koehler
*Assistant Examiner* — Ahmed F Seck
(74) *Attorney, Agent, or Firm* — Spencer Fane, LLP

(57) ABSTRACT

An electromagnetic rotary drive includes a rotor having a magnetically effective core, and a stator, with which the rotor can be magnetically driven without contact and magnetically levitated without contact with respect to the stator. The rotor is actively magnetically levitated in a radial plane perpendicular to the axial direction. The stator has coil cores including a leg extending from a first end to a second end, and a transverse leg at the second end and extending from the longitudinal leg in a radial direction. The coil cores are arranged around the magnetically effective core with respect to a circumferential direction, and a concentrated winding surrounds each longitudinal leg. A cooling device includes a cooling conduit for cooling fluid. The cooling conduit has a section arranged in the circumferential direction in an interspace between the longitudinal leg of two coil cores.

20 Claims, 7 Drawing Sheets

(56) References Cited

FOREIGN PATENT DOCUMENTS

| | | | | | |
|---|---|---|---|---|---|
| CN | 108199535 | A | * | 6/2018 | ............. H02K 21/22 |
| CN | 113364169 | A | * | 9/2021 | ................ H02K 3/24 |
| CN | 115250015 | A | * | 10/2022 | ........... H02K 1/2706 |
| CN | 106787302 | B | * | 8/2023 | ................ H02K 1/24 |
| EP | 3007336 | A1 | | 4/2006 | |
| EP | 3232549 | A1 | * | 10/2017 | ............. H02K 21/04 |
| EP | 3701979 | A1 | | 9/2020 | |
| JP | H01180227 | A | | 7/1989 | |

OTHER PUBLICATIONS

18607200_2025-11-13_CN_108199535_A_H.pdf (Year: 2025).*
18607200_2025-11-13_CN_113364169_A_H.pdf (Year: 2025).*
18607200_2025-11-13_CN_115250015_A_H.pdf (Year: 2025).*
18607200_2025-11-13_EP_3232549_A1_H.pdf (Year: 2025).*
18607200_2026-06-02_CN_106787302_B_H.pdf (Year: 2026).*
18607200_2026-06-02_CN_108199535_A_H.pdf (Year: 2026).*
18607200_2026-06-02_CN_113364169_A_H.pdf (Year: 2026).*
18607200_2026-06-02_CN_115250015_A_H.pdf (Year: 2026).*
18607200_2026-06-02_EP_3232549_A1_H.pdf (Year: 2026).*
European Search Report issued Sep. 12, 2023 in corresponding European Application No. 23166383.2.

* cited by examiner

ELECTROMAGNETIC ROTARY DRIVE AND CENTRIFUGAL PUMP

CROSS-REFERENCE TO RELATED APPLICATION

This application claims priority to European Application No. 23166383.2, filed Apr. 3, 2023, the contents of which are hereby incorporated by reference in its entirety.

BACKGROUND

Technical Field

The disclosure relates to an electromagnetic rotary drive and to a centrifugal pump having such an electromagnetic rotary drive.

Background Information

Electromagnetic rotary drives are known which are designed and operated according to the principle of the bearingless motor. The term bearingless motor means an electromagnetic rotary drive in which the rotor is levitated completely magnetically with respect to the stator, wherein no separate magnetic bearings are provided. For this purpose, the stator is designed as a bearing stator and drive stator, which is both the stator of the electric drive and the stator of the magnetic levitation. A magnetic rotating field can be generated with the electrical windings of the stator, which on the one hand exerts a torque on the rotor, which effects its rotation about a desired axis of rotation and which, on the other hand, exerts an arbitrarily adjustable transverse force to the rotor so that its radial position can be actively controlled or regulated. Thus, three degrees of freedom of the rotor can be actively regulated, namely its rotation and its radial position (two degrees of freedom). With respect to three further degrees of freedom, namely its position in the axial direction and tilting with respect to the radial plane perpendicular to the desired axis of rotation (two degrees of freedom), the rotor is passively magnetically levitated or stabilized by reluctance forces, i.e., it cannot be controlled. The absence of a separate magnetic bearing with a complete magnetic levitation of the rotor is the property, which gives the bearingless motor its name. In the bearing and drive stator, the bearing function cannot be separated from the drive function.

SUMMARY

Such a bearingless motor has proven itself in a large number of applications. Due to the absence of mechanical bearings, the bearingless motor is in particular suitable for pumping, mixing or stirring devices, with which very sensitive substances are conveyed, for example blood pumps, or on which very high demands are made with respect to purity, for example in the pharmaceutical industry or in the biotechnological industry, or with which abrasive or aggressive substances are conveyed, which would very quickly destroy mechanical bearings, for example pumps or mixers for slurry, sulfuric acid, phosphoric acid or other chemicals in the semiconductor industry.

A further advantage of the principle of the bearingless motor is the design of the rotor as an integral rotor, which is both the rotor of the electromagnetic rotary drive and the rotor of the pump. In addition to the magnetic levitation without contact, the advantage here is a very compact and space-saving design.

In addition, the principle of the bearingless motor also allows designs, e.g., of centrifugal pumps, in which the rotor can be separated from the stator very easily. This is a very great advantage, because in this way, for example, the rotor or the pump unit comprising the rotor can be designed as a single-use part for single use. Today, such single-use applications often replace processes in which, due to the very high purity requirements, all those components that come into contact with the substances to be treated in the process previously had to be cleaned and sterilized in an elaborate manner, for example by means of steam sterilization. When designed for single use, those components that come into contact with the substances to be treated are only used exactly once and are then replaced with new, i.e., unused, single-use parts for the next application.

The pharmaceutical industry and the biotechnological industry can be named as examples here. Solutions and suspensions are frequently produced here that require careful and gentle conveying of substances.

An advantageous design that is known per se of an electromagnetic rotary drive, which can be designed according to the principle of the bearingless motor, is the design as a temple motor, which is disclosed for example in EP-A-3 232 549. The present disclosure also relates to the design as a temple motor.

The characteristic feature of a temple motor is that the stator has a plurality of coil cores, each of which comprising a longitudinal leg, which extends parallel to the axial direction. The axial direction refers to that direction which is defined by the desired axis of rotation of the rotor, i.e., the axis of rotation about which the rotor rotates in the operating state when it is in a centered and non-tilted position with respect to the stator in the radial plane, which is perpendicular to the axial direction. Each longitudinal leg extends from a first end in the axial direction to a second end. Each coil core comprises, in addition to the longitudinal leg, a transverse leg, which is provided in each case at the second end of the longitudinal leg, and which extends in the radial direction towards inside, i.e., substantially at a right angle to the longitudinal leg. The coil cores each have the shape of an L, wherein the transverse legs form the short legs of the L. The rotor is then arranged between the transverse legs. The plurality of the longitudinal legs which extends in the axial direction, and which are reminiscent of the columns of a temple has given the temple motor its name.

In one design, the temple motor has, for example, six coil cores arranged circularly and equidistantly around the rotor (internal rotor). The first ends of the longitudinal legs are connected in the circumferential direction by a back iron, which serves to guide the magnetic flux. The rotor comprises a magnetically effective core, for example a permanent magnetic disk or a permanent magnetic ring, which is arranged between the radially inner ends of the transverse legs and rotates about the axial direction in the operating state, wherein the rotor is magnetically driven without contact and is magnetically levitated without contact with respect to the stator.

There are also known such designs of the temple motor in which the magnetically effective core is designed in a permanent magnetic-free manner, i.e., without permanent magnets. Then, the magnetically effective core of the rotor is, for example, designed in a ferromagnetic manner and includes, for example, of iron, nickel-iron, cobalt-iron, silicon iron, mu-metal, or another ferromagnetic material.

Furthermore, designs are possible in which the magnetically effective core of the rotor comprises both ferromagnetic materials and permanent magnetic materials. For example, permanent magnets can be placed or inserted into a ferromagnetic base body. Such designs are advantageous, for example, if one wishes to reduce the costs of large rotors by saving permanent magnetic material.

The longitudinal legs carry windings to generate the electromagnetic rotating fields necessary for the magnetic drive and the magnetic bearing of the rotor. For example, the windings are designed such that one concentrated winding is wound around each longitudinal leg, i.e., the coil axis of each concentrated winding extends in each case in the axial direction. Here, it is typical for the temple motor that the coil axes of the concentrated windings are parallel to the desired axis of rotation and that the concentrated windings are not arranged in the radial plane in which the rotor or the magnetically effective core of the rotor is levitated in the operating state.

One problem in the operation of such electromagnetic rotary drives is the dissipation of the heat generated during operation, for example the heat generated by the iron and copper losses. For the electronic components of the rotary drive in particular, an increased temperature leads to a reduction in service life. The motor performance can also be increased by dissipating the heat losses. The problem of heat dissipation still intensifies, if, for example, fluids with very high temperatures are conveyed or mixed with the rotary drive. In this case, heat is also transferred from the fluid to the electromagnetic rotary drive. In the semiconductor industry, for example, there are applications in which the fluid to be conveyed is hotter than 200° C., e.g., up to 220° C. In addition, these are often chemically aggressive substances, e.g., sulfuric acid or phosphoric acid.

Different measures are known to dissipate the heat which is generated by operation or introduced into the rotary drive by the fluid. For example, the housing of the rotary drive can be provided with cooling fins which dissipate the heat to the environment.

It is also known to provide a fan or a blower at the housing of the rotary drive to cool the rotary drive by means of an air flow. However, these fans have a delimited service life and are generally not very chemically resistant, so that they are less suitable for applications in the semiconductor industry, for example.

It is also known to provide a compressed air cooling at the housing of the rotary drive, for example with a hood attached to the housing into which compressed air is blown. However, compressed air is very expensive and therefore rather disadvantageous with regard to the economy of the process.

Furthermore, it is known to attach cooling plates to the housing of the rotary drive, through which a cooling liquid flows, for example, in order to dissipate the heat. However, it has been shown that such external cooling plates often do not ensure sufficient heat dissipation. One reason for this is the high thermal resistance, for example at the housing of the rotary drive, so that heat can only be dissipated in an inadequate manner from the inside of the housing, or the components arranged there by means of the cooling plate.

It has been shown in practice that in particular in applications where the fluid to be conveyed or the fluid to be mixed has temperatures above 70° C., such external coolings at the housing of the rotary drive does not ensure satisfying heat dissipation.

Motors are also known, for example from U.S. Pat. No. 10,530,221, in which cooling structures such as bores or channels are disposed in the housing wall of the motor through which a cooling liquid flows during operation of the motor. Such cooling structures in the housing wall, which have to be milled or drilled at great expense, are very complex and cause high manufacturing costs. In addition, additional seals are necessary. Additional coatings must then often be provided to ensure the desired chemical resistance. As a result, additional thermal resistance is generated, which in turn reduces the cooling performance.

Starting from this state of the art, it is therefore an object of the disclosure to propose an electromagnetic rotary drive, which is designed as a temple motor and in which an efficient heat dissipation from the rotary drive is ensured. In particular, the rotary drive should also be suitable for applications in which very hot fluids of, for example, up to 200° C. or even more are conveyed or mixed. Furthermore, it is an object of the disclosure to propose a centrifugal pump having such a rotary drive.

The subject matter of the disclosure meeting these object is characterized by the features disclosed herein.

According to the disclosure, an electromagnetic rotary drive is thus proposed, which is designed as a temple motor, having a rotor, which comprises a ring-shaped or disc-shaped magnetically effective core, and having a stator, which is designed as a bearing and drive stator, with which the rotor can be magnetically driven without contact in the operating state about a desired axis of rotation, which defines an axial direction, and with which the rotor can be magnetically levitated without contact with respect to the stator, wherein the rotor is actively magnetically levitated in a radial plane perpendicular to the axial direction, wherein the stator has a plurality of coil cores each of which comprises a longitudinal leg, which extends from a first end to a second end in the axial direction, and a transverse leg which is arranged at the second end of the longitudinal leg and in the radial plane and which extends from the longitudinal leg in a radial direction, wherein the coil cores are arranged around the magnetically effective core with respect to a circumferential direction, and wherein at least one concentrated winding is provided at each longitudinal leg, which surrounds the respective longitudinal leg. A cooling device is provided which comprises a first cooling conduit through which a cooling fluid can flow, wherein the first cooling conduit has at least one cooling conduit section which is arranged with respect to the circumferential direction in an interspace between the longitudinal legs of two adjacent coil cores and which extends in the axial direction.

Due to the fact that the at least one cooling conduit section is arranged in the interspace between two adjacent longitudinal legs and thus also between two circumferentially adjacent windings, heat is efficiently dissipated from the locations where it is generated. A substantial part of the heat generated during operation originates from the iron losses that occur, for example, in the longitudinal legs and from the copper losses that occur in the windings. Since the cooling conduit section is arranged directly adjacent to the longitudinal legs and to the windings arranged thereon, it cools exactly where two main heat sources are. Therefore, a very efficient heat dissipation results from the rotary drive.

Typically, the rotary drive comprises a stator housing in which the stator is arranged. Then, the cooling conduit section is arranged in the inner space of the stator housing, so that it is not necessary to provide complicated cooling structures, such as bores or cutouts in the wall of the stator housing. The cooling device can therefore be easily integrated into a temple motor without having to significantly change the design of the components of the temple motor. This is a very great advantage from a constructional point of view.

The cooling fluid is preferably a liquid, for example water, distilled water, or preferably demineralized or deionized water (DI water).

Preferably, the cooling conduit section is part of a cooling loop arranged entirely in one of the interspaces between the longitudinal legs of two adjacent longitudinal legs or extending across a plurality of the interspaces.

In a preferred embodiment, the first cooling conduit has at least one cooling loop and preferably a plurality of cooling loops, wherein each cooling loop is arranged in each case with respect to the circumferential direction in an interspace between the longitudinal legs of two adjacent coil cores, and wherein each cooling conduit section is in each case part of one of the cooling loops. In an embodiment of the first cooling conduit with several cooling loops, connecting segments are preferably provided for connecting adjacent cooling loops. Embodiments are possible in which one cooling loop is provided in each case in each interspace between two circumferentially adjacent longitudinal legs. Then the number of cooling loops is preferably equal to the number of coil cores.

However, such embodiments are also possible in which a cooling loop is not provided in each interspace between two circumferentially adjacent longitudinal legs. Then, the number of cooling loops is then preferably smaller than the number of coil cores.

Particularly preferably, each cooling loop is designed in each case in a U-shape, wherein the two legs of the U each extend in the axial direction and thus parallel to the longitudinal legs of the coil cores. The closed side of the U is arranged closer to the second ends of the longitudinal legs than the open side of the U, which is arranged closer to the first ends of the longitudinal legs. The connecting segments between adjacent cooling loops each connect one leg of the U-shaped cooling loop to one of the legs of a circumferentially adjacent U-shaped cooling loop.

Preferably, the first cooling conduit is designed in one piece with all cooling loops and with all connecting segments and extends from a first cooling connection to a second cooling connection. Especially preferably, the first cooling conduit is produced by bending a pipe. For example, an originally straight piece of pipe is formed by bending in such a way that the U-shaped cooling loops with the connecting segments arranged therebetween are formed.

Furthermore, it is preferred if the first cooling conduit is made of a stainless steel or a rustproof steel. Such a steel also has the advantage that it is more corrosion resistant than copper, for example. In particular, when DI water is used as a cooling fluid, which is more aggressive than, for example, normal water, it is advantageous to make the first cooling conduit from a rustproof steel or a stainless steel.

Preferably, the first cooling conduit has thus a plurality of cooling loops, and connecting segments for connecting adjacent cooling loops, wherein the connecting segments preferably each extend in the circumferential direction and are arranged radially outwardly adjacent to the first ends of the longitudinal legs of the coil cores.

In a preferred embodiment, the first ends of all longitudinal legs are connected by a back iron for guiding the magnetic flux, wherein the first cooling conduit extends region-wise adjacent to the back iron. Here, region-wise means, in particular, that the connecting segments can extend along the back iron so that the heat present in the back iron, i.e. in particular the heat generated by iron losses, is efficiently absorbed and dissipated where it is generated.

It is a further preferred measure that the cooling device comprises a second cooling conduit through which the cooling fluid can flow, wherein the second cooling conduit has an inner space loop which is arranged radially inwardly with respect to the windings in the inner space surrounded by the windings, wherein the inner space loop is preferably designed as a cooling spiral. Through this inner space loop or cooling spiral, both the heat generated by the concentrated windings, i.e., for example the copper losses, and the heat generated by iron losses in the coil cores, or the back iron can be efficiently dissipated, because it is absorbed there or in the direct vicinity of the place where it is generated.

It is preferred that the first cooling conduit and the second cooling conduit are connected to each other in series. Particularly preferably, the first cooling conduit and the second cooling conduit are designed in their entirety in one piece, wherein the cooling conduits arranged one behind the other or in series are produced by bending a pipe. For example, an originally straight piece of pipe is formed by bending in such a way that the U-shaped cooling loops with the connecting segments arranged therebetween and the second cooling conduit arranged in series are formed.

In a preferred embodiment, with respect to the axial direction, a first circuit board with electronic components is arranged between the windings and the transverse legs, wherein the cooling device comprises a first ring conduit or a second ring conduit, through each of which the cooling fluid can flow, wherein the first ring conduit and the second ring conduit each extend in the circumferential direction radially inwardly along the longitudinal legs of the coil cores, wherein the first ring conduit is arranged with respect to the axial direction between the first circuit board and the transverse legs, and wherein the second ring conduit is arranged with respect to the axial direction between the first circuit board and the windings. In this embodiment, a first circuit board, for example an electronic print or PCB (Printed Circuit Board), is arranged adjacent (with respect to the axial direction) to the transverse legs, which can contain, for example, electronic components for the control or operation of sensors, for example position sensors or magnetic field sensors, or components for the evaluation of the signals supplied by sensors.

The electronic components which are arranged on an electronic print should be particularly well protected against overheating because they are usually very sensitive and can be damaged, fail or have their service life reduced if too much heat is applied. Therefore, it is advantageous to arrange the first or the second ring conduit directly adjacent to the first circuit board so that this region is well cooled and the first circuit board with its electronic components is protected from overheating. In particular, if the rotary drive is designed as a centrifugal pump, the first circuit board is located in the direct vicinity of the pump housing in which the rotor is arranged. When conveying very hot fluids, which for example have a temperature of up to 200° C. or more, a considerable amount of heat is transferred from the fluid to be conveyed into the rotary drive and thus also into the first circuit board. Therefore, in such applications, it is particularly advantageous to provide the first or the second ring conduit so that the heat is dissipated directly from the region in which the first circuit board is arranged.

In particular, such embodiments are also possible in which the cooling device has the first ring conduit and the second ring conduit.

Preferably, the first ring conduit and/or the second ring conduit is/are integral part(s) of the second cooling conduit and are connected in series with the inner space loop and/or the cooling spiral.

In a preferred embodiment, a second circuit board with electronic components is provided, which is arranged with respect to the axial direction adjacent to the first ends of the longitudinal legs on the side facing away from the transverse legs, wherein the cooling device comprises a third ring conduit or a fourth ring conduit, through each of which the cooling fluid can flow, wherein the third ring conduit and the fourth ring conduit each extend in the circumferential direction, wherein the third ring conduit is arranged with respect to the axial direction between the second circuit board and the first ends of the longitudinal legs, and wherein the fourth ring conduit is arranged such that the second circuit board is located with respect to the axial direction between the first ends of the longitudinal legs and the fourth ring conduit.

If the first end of the legs is designated as the bottom and the second end of the legs is designated as the top, then the second circuit board is arranged below the coil cores. The third ring conduit is arranged between the second circuit board and the first ends of the longitudinal legs, wherein the latter are usually connected to one another via the back iron. The fourth ring conduit is arranged below the second circuit board. Thus, the third ring conduit and/or the fourth ring conduit can efficiently protect the second circuit board with its electronic components from excessive heat input and also dissipate heat from the back iron. For example, the power electronics for supplying and controlling the windings are provided on the second circuit board.

Embodiments are possible in which both the third ring conduit and the fourth ring conduit are provided, or embodiments in which the third ring conduit but not the fourth ring conduit is provided, or embodiments in which the fourth ring conduit but not the third ring conduit is provided.

Preferably, the third ring conduit and/or the fourth ring conduit is/are integral part(s) of the first cooling conduit and connected in series with the at least one cooling loop. Thus, only two cooling connections for the cooling fluid are required, namely a first cooling connection through which the cooling fluid is introduced into the first cooling conduit and into the second cooling conduit arranged in series, and a second cooling connection through which the cooling fluid is discharged after flowing through the first and the second cooling conduit.

According to a further preferred embodiment, two concentrated windings are provided at each longitudinal leg, each of which surrounds the respective longitudinal leg, and which are arranged adjacent to each other with respect to the axial direction.

It is a further preferred embodiment that a plurality of concentrated drive coils is provided, each of which is arranged in each case around the longitudinal legs of two adjacent coil cores, such that the two longitudinal legs are arranged within the drive coil with respect to the radial direction. These drive coils are thus also designed as concentrated windings, wherein, however, each drive coil is wound around two adjacent longitudinal legs in each case, so that the respective drive coil encloses the interspace between the two adjacent longitudinal legs.

In this embodiment, it is preferred that at least one of the cooling conduit sections or one of the cooling loops is arranged within one of the drive coils with respect to the radial direction. Thus, the drive coil surrounds this cooling conduit section or this cooling loop, whereby the cooling conduit section arranged in the drive coil or the cooling loop arranged in the drive coil can dissipate the heat generated by the drive winding particularly well.

Furthermore, a centrifugal pump for conveying a fluid is proposed by the disclosure, which comprises an electromagnetic rotary drive, which is designed according to the disclosure, wherein the rotor of the electromagnetic rotary drive is designed as the rotor of the centrifugal pump.

Preferably, the centrifugal pump comprises a pump housing comprising a pump inlet and a pump outlet for the fluid to be conveyed, wherein the rotor is arranged in the pump housing and comprises a plurality of vanes for conveying the fluid. The pump housing is designed in such a way that it can be inserted into the stator such that the magnetically effective core of the rotor is surrounded by the transverse legs.

Further advantageous measures and embodiments of the disclosure are apparent from the dependent claims.

BRIEF DESCRIPTION OF THE DRAWINGS

In the following, embodiments of the invention will be explained in more detail using the drawings

DETAILED DESCRIPTION

Figure 1:
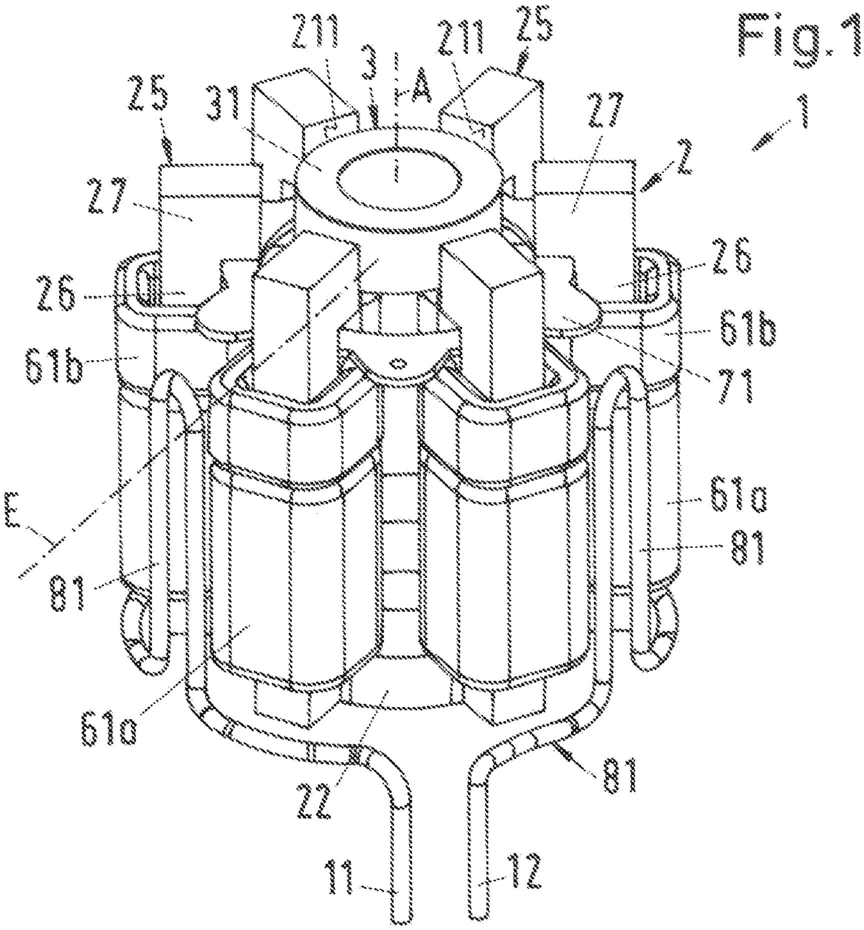
FIG. 1 illustrates a perspective view of a first embodiment of an electromagnetic rotary drive according to the disclosure.

FIG. 1 shows a perspective view of a first embodiment of an electromagnetic rotary drive according to the disclosure, which is designated in its entirety by the reference numeral 1. The electromagnetic rotary drive 1 is designed as a temple motor and comprises a stator 2, which has a plurality of coil cores 25—in this case six coil cores 25—each of which comprises a longitudinal 26, which extends in the axial direction A, and a transverse leg 27 arranged perpendicular to the longitudinal leg 26, which transverse leg 27 extends in a radial direction and is delimited by an end face 211. The coil cores 25 are arranged equidistantly on a circular line so that the end faces 211 surround a rotor 3 of the electromagnetic rotary drive 1. Two concentrated windings 61*a*, 61*b* are provided in each case at each longitudinal leg 26, each of which surrounds the respective longitudinal leg 26, and which are arranged adjacent to each other with respect to the axial direction A. In other embodiments (see, e.g., FIG. 7), exactly one concentrated winding 61 is arranged at each longitudinal leg 26, which surrounds the respective longitudinal leg 26.

The longitudinal legs 26 are each designed in a rod-shaped manner or substantially in a rod-shaped manner. In particular, the longitudinal legs 26 can also be designed as represented, for example, in FIG. 3 or in FIG. 5 of EP 4 084 304 A1.

The rotor 3 is magnetically levitated without contact with respect to the stator 2. Furthermore, the rotor 3 can be magnetically driven without contact by means of the stator 2 to rotate about a desired axis of rotation. The desired axis of rotation refers to that axis about which the rotor 3 rotates in the operating state when the rotor 3 is in a centered and not tilted position with respect to the stator 2, as represented in FIG. 1. This desired axis of rotation defines the axial direction A. Usually, the desired axis of rotation defining the axial direction A corresponds to the central axis of the stator 2.

In the following, a radial direction refers to a direction, which stands perpendicular on the axial direction A.

It is understood that the number of six coil cores 25 is to be understood only as an example. Of course, such embodiments are also possible in which the stator 2 has fewer than six, e.g., five, coil cores 25, or such embodiments in which the stator 2 has more than six, e.g., seven or eight, coil cores 25 (see e.g., FIG. 10).

The rotor 3 comprises a magnetically effective core 31, which is designed in a ring-shaped or disk-shaped manner. According to the representation in FIG. 1, the magnetically effective core 31 is designed as a ring and defines a magnetic center plane. Alternatively, the magnetically effective core 31 can also be designed as a disk. As a rule, in a disk-shaped or ring-shaped magnetically effective core 31, the magnetic center plane is the geometric center plane of the magnetically effective core 31 of the rotor 3, which is perpendicular to the axial direction A. In the operating state, the magnetically effective core 31 is levitated in a radial plane which stands perpendicular on the axial direction A. In FIG. 1, the radial plane is indicated by the line E, which stands perpendicular on the axial direction A. The radial plane E is therefore that plane which stands perpendicular on the axial direction A and contains the line E.

The radial plane E is that plane in which the magnetically effective core 31 of the rotor 3 is actively magnetically levitated between the end faces 211 in the stator 2 in the operating state. If the rotor 3 is not tilted and is not deflected in the axial direction A, the magnetic center plane lies in the radial plane E. The radial plane E defines the x-y plane of a Cartesian coordinate system whose z-axis runs in the axial direction A.

The radial position of the magnetically effective core 31 or the rotor 3 denotes the position of the rotor 3 in the radial plane E.

Since it is sufficient for the understanding of the disclosure, only the magnetically effective core 31 of the rotor 3 is shown in each of FIGS. 1, 3, 5, 7, 8 and 10 in the drawing. It is understood that the rotor 3 can, of course, comprise other components such as jackets or encapsulations, which are preferably made of a plastic, or of a metal, or of a metal alloy, or of a ceramic or a ceramic material. Furthermore, the rotor 3 can also comprise vanes for mixing, agitating or pumping fluids (see, e.g., FIG. 13) or other components.

The stator 2 is usually arranged in a stator housing 20 (see FIG. 12), which completely encloses the stator 2, so that the entire stator 2 is arranged inside the stator housing 20. For better understanding, the stator housing 20 is not represented in FIGS. 1, 3, 5, 7, 8 and 10, so that the components of the stator 2 arranged in the stator housing 20 can be seen.

Particularly preferably, the stator housing 20 is designed as a hermetically sealed stator housing 20 which completely encapsulates the stator 2. The stator housing 20 is preferably filled with a thermally conductive casting compound, for example with an epoxy resin or with a polyurethane, so that the stator 2 and possibly further components arranged inside the stator housing 20 are surrounded by the casting compound. As a result, the general thermal resistance is reduced, and vibrations are dampened.

The rotor 3 and in particular the magnetically effective core 31 of the rotor 3 are surrounded by the radially outwardly arranged transverse legs 27 of the coil cores 25 of the stator 2. Thus, the transverse legs 27 form a plurality of pronounced stator poles—here six stator poles. The longitudinal legs 26 of the coil cores 25 each extend in the axial direction A from a first end, which is the lower end according to the representation, to a second end, which is the upper end according to the representation. The transverse legs 27 are arranged at the upper ends of the longitudinal legs 26 and in the radial plane E. Each transverse leg 27 extends in the radial direction towards the rotor 3.

When the magnetically effective core 31 of the rotor 3 is in its desired position during operation, the magnetically effective core 31 is centered between the end faces 211 of the transverse legs 27 so that the transverse legs 27 arranged in the radial plane E are also located in the magnetic center plane. According to the representation, the concentrated windings 61*a*, 61*b* are arranged below the radial plane E and are aligned such that their coil axes extend in the axial direction A.

All first ends of the longitudinal legs 26—i.e., the lower ends according to the representation—are connected to one another by a back iron 22. The back iron 22 is preferably designed in a ring-shaped manner. Such embodiments are possible (see FIG. 1) in which the back iron 22 extends radially inwardly along all first ends of the longitudinal legs 26. However, it is also possible that the back iron 22 has a plurality of recesses along its circumference, each of which receives one of the first ends. In other embodiments, the back iron can also comprise a plurality of ring segments, each of which is arranged in each case between two circumferentially adjacent coil cores 25 in the region of the first ends.

In order to generate the electromagnetic rotating fields required for the magnetic drive and the magnetic levitation of the rotor 3, the longitudinal legs 26 of the coil cores 25 carry the windings designed as concentrated windings 61*a*, 61*b*, wherein in the first embodiment exactly two concentrated windings 61*a*, 61*b* are arranged around each longitudinal leg 26 in each case, which are adjacent with respect to the axial direction A. In the operating state, those electromagnetic rotating fields are generated with these concentrated windings 61*a*, 61*b* with which a torque is effected on the rotor 3 and with which an arbitrarily adjustable transverse force can be exerted on the rotor 3 in the radial direction, so that the radial position of the rotor 3, i.e. its position in the radial plane E perpendicular to the axial direction A, can be actively controlled or regulated.

The "magnetically effective core 31" of the rotor 3 refers to that region of the rotor 3 which magnetically interacts with the stator 2 for torque generation and the generation of magnetic levitation forces.

As already mentioned, the magnetically effective core 31 is designed in a ring-shaped manner in this embodiment. Furthermore, the magnetically effective core 31 is designed in a permanent magnetic manner. For this purpose, the magnetically effective core 31 can comprise at least one permanent magnet, but also several permanent magnets, or—as in the embodiment described here—consist entirely of a permanent magnetic material, so that the magnetically effective core 31 is the permanent magnet. For example, the magnetically effective core 31 is magnetized in the radial direction.

Those ferromagnetic or ferrimagnetic materials, which are magnetically hard, that is which have a high coercive field strength, are typically called permanent magnets. The coercive field strength is that magnetic field strength which is required to demagnetize a material. Within the framework of this application, a permanent magnet is understood as a material or a matter, which has a coercive field strength, more precisely a coercive field strength of the magnetic polarization, which amounts to more than 10'000 A/m.

Embodiments are also possible in which the magnetically effective core 31 is designed in a permanent magnet-free manner, i.e., without permanent magnets. The rotor 3 is then designed, for example, as a reluctance rotor. Then, the magnetically effective core 31 of the rotor 3 is made of a soft magnetic material, for example. Suitable soft magnetic materials for the magnetically effective core 31 are, for example, ferromagnetic or ferrimagnetic materials, i.e., in particular iron, nickel-iron, cobalt-iron, silicon iron, mu-metal.

Furthermore, embodiments are possible in which the magnetically effective core 31 of the rotor 3 comprises both ferromagnetic materials and permanent magnetic materials. For example, permanent magnets can be placed or inserted in a ferromagnetic base body. Such embodiments are advantageous, for example, if costs of large rotors are to be reduced by saving permanent magnetic material.

Embodiments are also possible in which the rotor is designed according to the principle of a cage rotor.

Both the ring-shaped back iron 22 and the coil cores 25 of the stator 2 are each made of a soft magnetic material because they serve as flux conducting elements to guide the magnetic flux.

Suitable soft magnetic materials for the coil cores 25 and the back iron 22 are, for example, ferromagnetic or ferrimagnetic materials, i.e., in particular iron, nickel-iron, cobalt-iron, silicon iron or mu-metal. In this case, a design as a stator sheet stack is preferred for the stator 2, in which the coil cores 25 and the back iron 22 are designed in sheet metal, i.e., they consist of several thin sheet metal elements, which are stacked.

Furthermore, it is possible that the coil cores 25 and the back iron 22 are made of pressed and subsequently sintered grains of the aforementioned materials. The metallic grains are preferably embedded in a plastic matrix so that they are at least partially insulated from one another, whereby eddy current losses can be minimized. Thus, soft magnetic composites which consist of electrically insulated and compressed metal particles are also suitable for the stator. In particular, these soft magnetic composites, which are also designated as SMC (Soft Magnetic Composites), can consist of iron powder particles coated with an electrically insulating layer. These SMC are then formed into the desired shape by means of powder metallurgy processes.

During operation of the electromagnetic rotary drive 1, the magnetically effective core 31 of the rotor 3 interacts with the stator 2 according to the principle of the bearingless motor described above, in which the rotor 3 can be magnetically driven without contact and can be magnetically levitated without contact with respect to the stator 2. For this purpose, the stator 2 is designed as a bearing and drive stator, with which the rotor 3 can be magnetically driven without contact in the operating state about the desired axis of rotation—i.e., it can be set into rotation—and can be magnetically levitated without contact with respect to the stator 2. Three degrees of freedom of the rotor 3 can be actively regulated, namely its position in the radial plane E and its rotation. With respect to its axial deflection from the radial plane E in the axial direction A, the magnetically effective core 31 of the rotor 3 is passively magnetically stabilized by reluctance forces, i.e., it cannot be controlled. Also, with respect to the remaining two degrees of freedom, namely tilts with respect to the radial plane E perpendicular to the desired axis of rotation, the magnetically effective core 31 of the rotor 3 is also passively magnetically stabilized. Due to the interaction of the magnetically effective core 31 with the coil cores 25, the rotor 3 is thus passively magnetically levitated or passively magnetically stabilized in the axial direction A and against tilts (a total of three degrees of freedom) and actively magnetically levitated in the radial plane (two degrees of freedom).

In the framework of this application as, is generally the case, an active magnetic levitation is also referred to one which can be actively controlled or regulated, for example by the electromagnetic rotating fields generated by the concentrated windings 61*a*, 61*b*. A passive magnetic levitation or a passive magnetic stabilization is one that cannot be controlled or regulated. The passive magnetic levitation or stabilization is based, for example, on reluctance forces, which bring the rotor 3 back again to its desired position when it is deflected from its desired position, e.g., when it is displaced or deflected in the axial direction A or when it is tilted.

A radial levitation or a levitation in a radial manner refers to a levitation of the rotor 3 with which the radial position of the rotor 3 can be stabilized, i.e., a levitation which levitates the rotor 3 in the radial plane F and thus with respect to its radial position.

An axial levitation or a levitation in an axial manner and an axial stabilization or a stabilization in an axial manner, respectively, refers to a levitation or a stabilization of the rotor 3 with which, on the one hand, the position of the rotor 3 is stabilized with respect to the axial direction A and with which, on the other hand, the rotor 3 is stabilized against tilts. Such tilts represent two degrees of freedom and designate deflections in which the momentary axis of rotation of the rotor 3 no longer points exactly in the axial direction A but encloses an angle different from zero with the desired axis of rotation. In the case of a tilt, the magnetic center plane C thus no longer lies in or parallel to the radial plane E, but the magnetic center plane C encloses an angle different from zero with the radial plane E.

In a bearingless motor, in contrast to classical magnetic bearings, the magnetic levitation and the drive of the motor is realized by electromagnetic rotating fields. Typically, in the bearingless motor, the magnetic drive and levitation function is generated by the superposition of two magnetic rotating fields, which are usually designated as drive and control fields. These two rotating fields generated with the windings of the stator 2 usually have a pole pair number that differs by one. For example, if the drive field has the pole pair number p, the control field has the pole pair number p+1 or p−1. In this case, tangential forces acting on the magnetically effective core 31 in the radial plane are generated by the drive field, causing a torque, which causes the rotation about the axial direction A. Due to the superposition of the drive field and the control field, it is also possible to generate an arbitrarily adjustable transverse force on the magnetically effective core 31 in the radial plane, with which the position of the magnetically effective core 31 in the radial plane can be regulated. Thus, it is not possible to divide the electromagnetic flux generated by the concentrated windings 61*a*, 61*b* into an (electro-) magnetic flux that only provides for driving the rotation and an (electro-) magnetic flux that only realizes the magnetic levitation.

To generate the drive field and the control field, it is possible on the one hand—as shown in FIG. 1—to use two different winding systems, namely one to generate the drive field and one to generate the control field. The coils for generating the drive field are then usually referred to as drive coils 61*a* and the coils for generating the control field as control coils 61*b*.

Thus, for example, one of the concentrated windings can be used as the drive coil 61*a*, while the other concentrated winding adjacent to it is used as the control coil 61*b*. The current impressed in these coils is then referred to as the drive current and the control current, respectively. The drive field, which is an electromagnetic rotating field, is then generated with the totality of all the drive coils 61*a*, while the control field, which is also an electromagnetic rotating field, is generated with the totality of the control coils 61*b* and is superimposed on the drive field. Due to the superposition of the drive field and the control field, the tangential forces on the rotor 3 can then be generated, which generate the torque for driving the rotation, as well as an arbitrarily adjustable transverse force in the radial plane E, with which the position of the magnetically effective core 31 in the radial plane can be actively regulated.

However, such embodiments are also possible (see, e.g., FIG. 7) in which the drive function and levitation function is generated with only one single winding system, so that there is no distinction between drive coils and control coils. This can be realized in such a way that the values for the drive current and the control current determined in each case by a control device are mathematically added or superimposed—that is e.g., with the aid of software—and the resulting total current is impressed into the respective concentrated winding 61 (see FIG. 7). In this case, of course, it is no longer possible to distinguish between control coils and drive coils but exactly one concentrated winding 61 (FIG. 7) is provided on each longitudinal leg 26. There is then only one winding system in whose concentrated windings 61 the mathematically determined sum of the drive current and the control current is impressed.

Depending on the application, the embodiment with separate drive coils 61*a* and separate control coils 61*b* can simplify the control or regulation of the electromagnetic rotary drive 1.

In the first embodiment, a first circuit board 71 with electronic components not represented in more detail is also provided. The first circuit board 71 is preferably designed as an electronic print or PCB (printed circuit board). For example, such components can be provided on the first circuit board 71 that are used for the control of sensors (not represented) and/or for the evaluation of the measurement signals determined by sensors. Such sensors comprise, for example, position sensors for determining the current position of the rotor 2.

The first circuit board 71 is designed substantially ring-shaped and arranged parallel to the radial plane E. Preferably, the ring-shaped first circuit board 71 is arranged radially inwardly with respect to the coil cores 25, wherein the first circuit board 71—as can be seen in FIG. 1—can also extend into the interspaces between the longitudinal legs 26 of adjacent coil cores 25.

With respect to the axial direction A, the first circuit board 71 is arranged between the windings 61*b* and the transverse legs 27 of the coil cores 25. According to the representation in FIG. 1, the first circuit board 71 is thus arranged below and adjacent to the transverse legs 27, which are arranged around the magnetically effective core 31 of the rotor 3.

According to the disclosure, the electromagnetic rotary drive 1 comprises a cooling device 10 (FIG. 2) which comprises at least a first cooling conduit 8 through which a cooling fluid can flow. The first cooling conduit 8 has at least one cooling conduit section 80 which is arranged with respect to the circumferential direction in the interspace between the longitudinal legs 26 of two adjacent coil cores 25 and which extends in the axial direction A. Substantially, each cooling conduit section 80 extends along and is arranged adjacent to one of the longitudinal legs 26.

Figure 2:
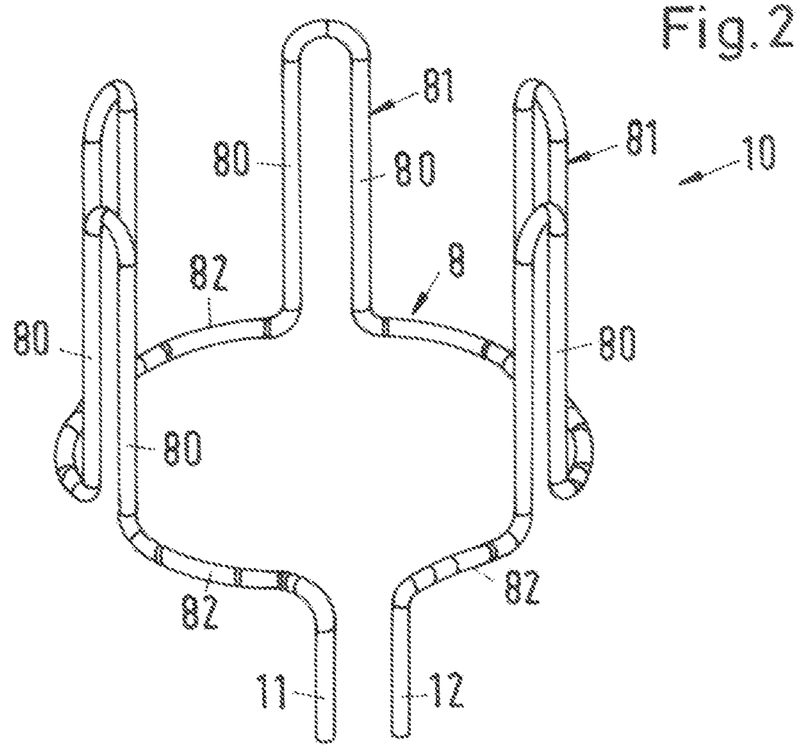
FIG. 2 illustrates a perspective view of the cooling device of the first embodiment.

In the arrangement represented in FIG. 1 and FIG. 2, two cooling conduit sections 80 extending substantially parallel to each other are connected in each case by a curved connection to form a cooling loop 81, so that the cooling fluid flows upwardly in one of the two cooling conduit sections 80 according to the representation and flows downwardly in the other of the two cooling conduit sections 80 according to the representation. Each cooling loop 81, which respectively comprises two of the cooling conduit sections 80, is arranged with respect to the circumferential direction in exactly one of the interspaces between the longitudinal legs 26 of two adjacent coil cores 25.

In other embodiments, it is also possible that at least one of the cooling loops 81 extends through more than one of the interspaces between the longitudinal legs 26 of two adjacent coil cores 25. For example, one of the cooling conduit sections 80 of the cooling loop 81 can be arranged in one of the interspaces, and the other cooling conduit section 80 belonging to the same cooling loop 81 is arranged in another interspace, for example an adjacent interspace. The curved connection between these two cooling conduit sections 80 can then be arranged, for example, according to the representation, above that winding 61*b* which separates these two interspaces from each other.

Due to the arrangement of the cooling loop 81 between adjacent longitudinal legs 26 represented in FIG. 1, it is possible to absorb in and dissipate the heat from the regions where significant heat sources are located. Namely, during operation of the rotary drive, heat is generated in the coil cores 25 by iron losses, and heat is generated in the concentrated windings 61*a*, 61*b* arranged around the longitudinal legs 26 by copper losses. Since the cooling loop 81 is arranged in the interspace between two adjacent longitudinal legs 25 and thus also in the interspace between the concentrated windings 61*a*, 61*b* which carry these adjacent longitudinal legs 26, heat is efficiently dissipated from the region where a main heat source is located in the operating state.

The cooling fluid is preferably a liquid. A particularly preferred cooling fluid is demineralized or deionized water (DI water). DI water is a typical cooling fluid, which is often used, for example, in the production facilities of the semiconductor industry.

The conduits of the cooling device 10, i.e., for example the first cooling conduit 8 with the cooling loop 81, are preferably made of a rustproof steel or a stainless steel. Depending on the application, it is also possible that the conduits of the cooling device 10 are made of copper or aluminum. But in particular when DI water is used as cooling fluid, a rustproof steel or a stainless steel is preferred for the conduits, because it is more corrosion resistant than for example copper.

For better understanding, FIG. 2 shows a perspective view of the cooling device 10 of the first embodiment. The cooling device 10 comprises the first cooling conduit 8 and two cooling connections 11, 12, namely a first cooling connection 11 and a second cooling connection 12, through which the cooling fluid can be introduced into the first cooling conduit 8 or removed from the first cooling conduit 8. The cooling connections 11, 12, which are not represented in detail, each comprise a feedthrough through the stator housing 20 (FIG. 12), so that the cooling fluid can be fed into the first cooling conduit 8 from outside the stator housing 20 by means of, for example, the first cooling connection 11 through the wall of the stator housing 20 and can be discharged again through the wall of the stator housing 20 by means of the second cooling connection 12.

In the first embodiment, the first cooling conduit 8 comprises a plurality of cooling loops 81, in this case namely five cooling loops 81, each of which is arranged in each case with respect to the circumferential direction in the interspace between two adjacent coil cores 25, wherein at most one cooling loop 81 is provided in each interspace. All cooling loops 81 are arranged in series, i.e., one behind the other. Furthermore, the first cooling conduit 8 comprises a plurality of connecting segments 82 for connecting adjacent cooling loops 81 and for connection to the cooling connections 11, 12.

Each of the cooling loops 81 is designed in a U-shape, wherein the closed side of the U is arranged in each case adjacent to the second ends of the longitudinal legs 26—i.e., according to the representation (FIG. 1) at the top—and the open side of the U is arranged adjacent to the first ends of the longitudinal legs 26—i.e., according to the representation at the bottom. The two legs of the U each extend in axial direction A and thus parallel to the longitudinal legs 26 of the coil cores 25. The distance of the two legs of each U-shaped cooling loop 81 is dimensioned such that the cooling loop 81 fits into the interspace between two circumferentially adjacent windings 61*a* and 61*b*, respectively.

One of the connecting segments 82 is arranged in each case between two circumferentially adjacent cooling loops 81, which connects one of the legs of the U-shaped cooling loop 81 at the open side of the U to the adjacent leg of the adjacent U-shaped cooling loop 81, so that all the cooling loops 81 are arranged in series in terms of flow.

The connecting segments 82 between adjacent cooling loops 81 or between the cooling connections 11, 12 and the cooling loops 81 each extend arcuately in the circumferential direction and are arranged radially outwardly and adjacent to the first ends of the longitudinal legs 25 and the back iron 22. With respect to the axial direction, the connecting segments 82 are arranged at the same height as the back iron 22, so that the connecting segments 82 substantially follow the course of the back iron 22 radially outwardly. This also results in a particularly efficient heat dissipation from the region of the back iron 22.

Altogether, the first cooling conduit 8 with the cooling loops 81 and the connecting segments 82 has a circular course and extends in the circumferential direction around the entire stator 2, which can be seen clearly in FIG. 2 in particular. The two cooling connections 11, 12 are arranged adjacent to each other and each extend in the axial direction A, i.e., parallel to each other. Each cooling connection 11, 12 extends in each case from the inner space of the stator housing 20 (FIG. 12) through the wall of the stator housing 20 to the outside. The first cooling conduit 8 extends from the first cooling connection 11 in circumferential direction and radially outwardly adjacent to the back iron 22 around the stator 2 to the second cooling connection 12, wherein the U-shaped cooling loops 81 are provided between adjacent coil cores 25, each extending upwardly parallel to the longitudinal legs 26 of the coil cores 25 according to the representation, for example to the upper axial end of the concentrated windings 61*b* or to just below the first circuit board 71.

As already mentioned, in the first embodiment exactly six coil cores 25 and exactly five cooling loops 81 are provided with an exemplary nature. With six coil cores 25 arranged on a circular line, there are a total of six interspaces between respectively adjacent coil cores 25 with respect to the circumferential direction. One of the cooling loops 81 is provided in each case in five of these interspaces, and the two cooling connections 11, 12 arranged parallel to each other are arranged with respect to the axial direction A below, according to the representation, that interspace in which no cooling loop 81 is provided.

Thus, in the first embodiment, the number of cooling loops 81 is less than the number of interspaces between circumferentially adjacent coil cores 25 by one. However, such embodiments are also possible in which one of the cooling loops 81 is arranged in each case in each of the interspaces. Embodiments are also possible in which the difference between the number of interspaces between circumferentially adjacent coil cores 25 and the number of cooling loops 81 is greater than one. For example, embodiments are possible in which a cooling loop 81 is provided only in every second interspace, so that, viewed in the circumferential direction, there is in each case an interspace without a cooling loop between two interspaces in which a cooling loop 81 is arranged.

The number of cooling loops 81 and also the course of the first cooling conduit 8 can be adapted depending on the application. Here, substantial factors are the size of the rotary drive 1, the space available in the stator 2 and the required cooling capacity. For example, if the rotary drive 1 is designed as a centrifugal pump and very hot fluids of, for example, more than 70° C. have to be conveyed, it must be considered that the fluid to be conveyed also transfers heat into the stator 2, so that a greater heat dissipation is advantageous.

Particularly preferably, the first cooling conduit 8 is designed in one piece with the cooling loops 81 and the connecting segments 82. Particularly preferably, the first cooling conduit 8 is produced by bending a pipe. This can be done, for example, in such a way that an originally straight pipe, for example a stainless-steel pipe, is formed by bending in such a way that the cooling loops 81 and the connecting segments 82 are formed. It can be seen that the shape of the first cooling conduit 8 represented in FIG. 2 can be produced by bending an originally straight pipe.

Figure 3:
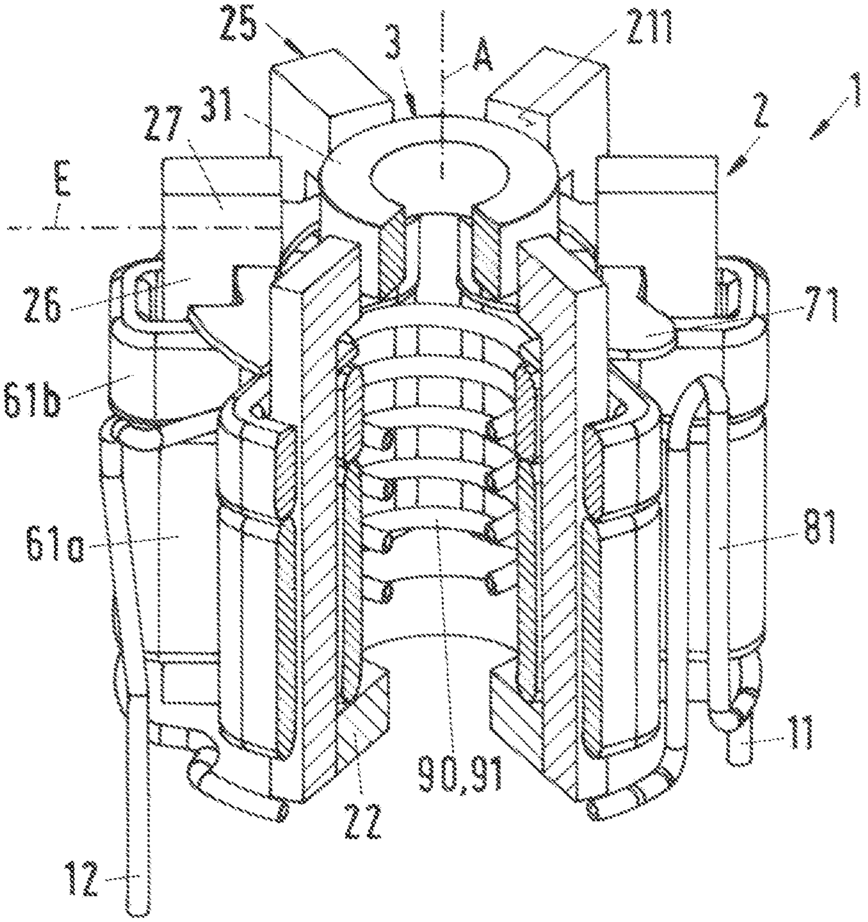
FIG. 3 illustrates a perspective view of a second embodiment of an electromagnetic rotary drive according to the disclosure, partly in section.
Figure 4:
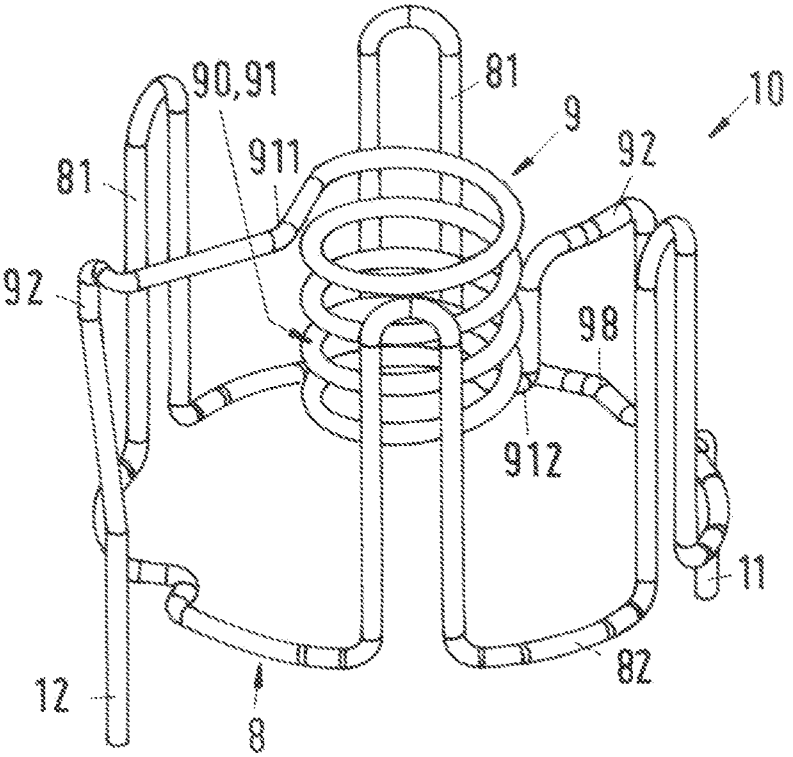
FIG. 4 illustrates a perspective view of the cooling device of the second embodiment.

FIG. 3 shows a perspective view of a second embodiment of a rotary drive 1 according to the disclosure. In FIG. 3, a segment is cut out of the stator 2 so that the interior of the space surrounded by the coil cores 25 can be seen. For better understanding, FIG. 4 shows the cooling device 10 of the second embodiment in a perspective view.

In the following, only the differences from the first embodiment will be looked at. The same parts or parts equivalent in function of the second embodiment are designated with the same reference signs as in the first embodiment. In particular, the reference signs have the same meaning as already explained in connection with the first embodiment. It is understood that all previous explanations of the first embodiment also apply in the same way or in the analogously same way to the second embodiment.

In the second embodiment, the first cooling conduit 8 has four cooling loops 81, each of which is arranged in one of the interspaces between the longitudinal legs 26 of adjacent coil cores 25, wherein each cooling loop 81 is arranged in a different interspace. Thus, one cooling loop 81 is arranged in each case in four of the six interspaces, and the remaining two interspaces are designed without a cooling loop 81.

Furthermore, the cooling device 10 further comprises a second cooling conduit 9 through which the cooling fluid can flow. The second cooling conduit 9 has an inner space loop 90 which is arranged radially inwardly with respect to the windings 61*a*, 61*b* in the inner space surrounded by the windings 61*a*, 61*b*. The inner space loop 90 is preferably designed as a cooling spiral 91—as shown in FIG. 3 and FIG. 4.

The cooling spiral 91 is arranged radially inwardly with respect to the concentrated windings 61*a*, 61*b* so that the windings 61*a*, 61*b* are arranged around the cooling spiral 91. The cooling spiral 91 is arranged in the space surrounded by the coil cores 25 or the windings 61*a*, 61*b* and can thus efficiently dissipate the heat from this region. In particular, this is also the heat generated by copper losses in the windings 61*a*, 61*b*.

The axis of the cooling spiral 91 runs in the axial direction A. In a manner known per se, the cooling spiral 91 comprises several turns which are arranged adjacent in the axial direction A, wherein all turns have the same diameter. In the region of the cooling spiral 91, the second cooling conduit 9 is consequently designed in a helical shape.

The cooling spiral 91 extends from a first end 911, which is the upper end according to the representation, to a second end 912, which is the lower end according to the representation. The outer diameter of the cooling spiral 91 is preferably dimensioned such that it is only slightly smaller than the inner diameter of the space enclosed by the windings 61*a*, 61*b*, so that the turns of the cooling spiral 91 are arranged directly adjacent to the windings 61*a*, 61*b* with respect to the radial direction. In the region of the cooling coil 91, the second cooling conduit 9 thus runs helically from the first end 911 along the radially inwardly surfaces of the windings 61*a*, 61*b* to the second end 912.

The first end 911 of the cooling spiral 91 is connected to the second cooling connection 12 via a connecting segment 92 of the second cooling conduit 9. The second end 912 of the cooling spiral 91 is connected to a connecting element 98 via a connecting segment 92 of the second cooling conduit 9, which connecting element 98 connects the second cooling conduit 9 to the first cooling conduit 8 so that the first cooling conduit 8 and the second cooling conduit 9 are connected in series. The first cooling conduit 8 extends from the connecting element 98 to the first cooling connection 11.

Preferably, the two connecting segments 92 of the second cooling conduit 9, which connect the cooling spiral 91 to the second cooling connection 12 and to the connecting element 98, respectively, are arranged such that they run through each one of those interspaces between the longitudinal legs 26 of adjacent coil cores 25 in which no cooling loop 81 is provided.

The second cooling conduit 9 is also preferably made of a rustproof steel or a stainless steel.

The cooling fluid is fed through one of the two cooling connections 11, 12, for example through the first cooling connection 11, flows through the first cooling conduit 8 with the cooling loops 81, then flows through the connecting element 98 into the second cooling conduit 9 and, after flowing through the second cooling conduit 9, flows off through the second cooling connection 12.

Particularly preferably, the second cooling conduit 9 is designed in one piece with the cooling spiral 91 and the connecting segments 92. Particularly preferably, the second cooling conduit 9 is produced by bending a pipe. This can be done, for example, in such a way that an originally straight pipe, for example a stainless-steel pipe, is formed by bending in such a way that the cooling spiral 91 and the connecting segments 92 are formed. It can be seen that the shape of the second cooling conduit 9 represented in FIG. 4 can be produced by bending an originally straight pipe.

For constructional reasons it is preferred that the first cooling conduit 8 and the second cooling conduit 9 are each first separately made in one piece by bending a pipe and then connected to each other by means of the connecting element 98 so that they are arranged in series in terms of flow.

The connecting element 98, which connects the first cooling conduit 8 to the second cooling conduit 9, is preferably designed as a flexible connecting element 98, which also simplifies the joining of the first cooling conduit 8 and the second cooling conduit 9. The connecting element 98 can, for example, be designed as a tube-clamp connection, and comprise a piece of tube of suitable length and two clamps. By means of the clamps, the piece of tube is fixed on the one hand to the first cooling conduit 8 and on the other hand to the second cooling conduit 9. 2-ear clamps or 2-ear clips are particularly suitable as clamps, which ensure an all-round seal at the connection between the first cooling conduit 8 and the second cooling conduit 9.

It is a further preferred measure that the cooling conduits 8, 9 are protected from the electrical or electronic components by insulating foils or by an insulating tape, for example an adhesive insulating tape, so that undesirable electrical currents or charges or electrical flashovers do not occur in the cooling device 10.

To further increase operational safety, it is an advantageous measure to ground the first cooling conduit 8 and/or the second cooling conduit 9. For example, this can be realized with a grounding cable which is connected on the one hand to the first cooling conduit 8 and/or to the second cooling conduit 9 and on the other hand to the earth potential.

The inner space loop 90 can also be designed in a different shape than the previously described cooling spiral 91. For example, the inner space loop 90 can be meandering or undulating in design, wherein, for example, the crests of the undulations are arranged adjacent to the second ends of the longitudinal legs 26, and the troughs of the undulations are arranged adjacent to the first ends of the longitudinal legs 26.

Figure 5:
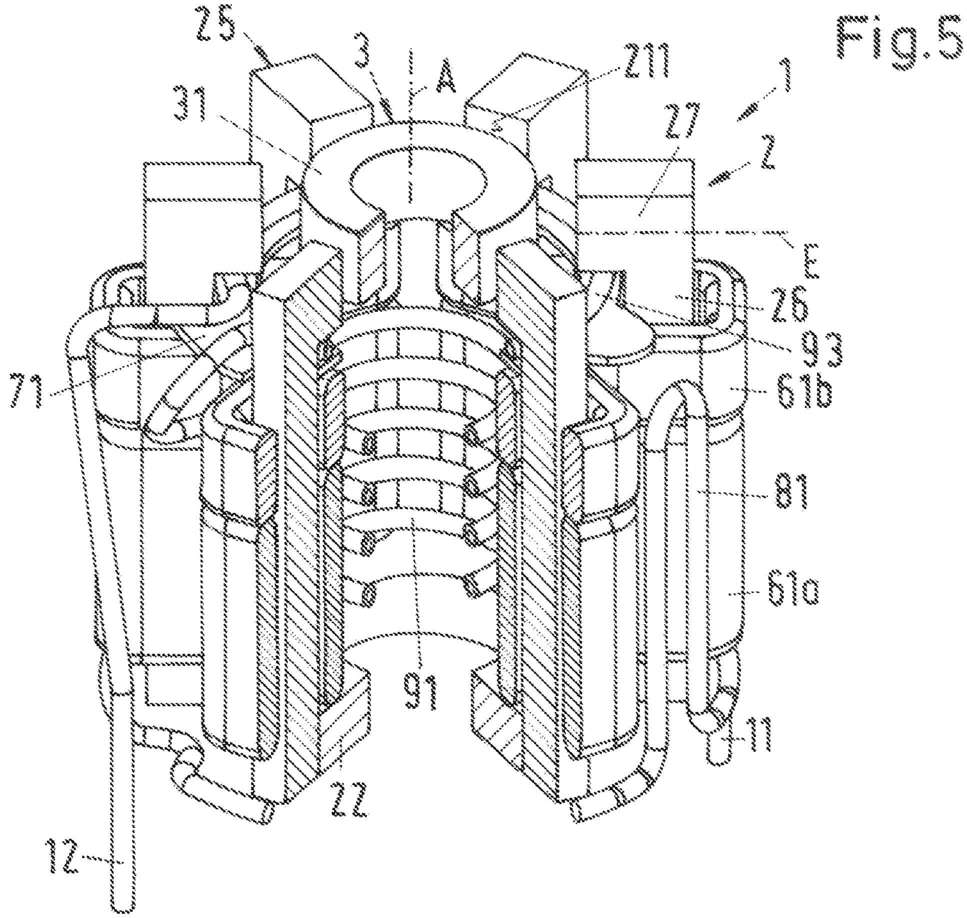
FIG. 5 illustrates a perspective view of a third embodiment of an electromagnetic rotary drive according to the disclosure, partly in section.
Figure 6:
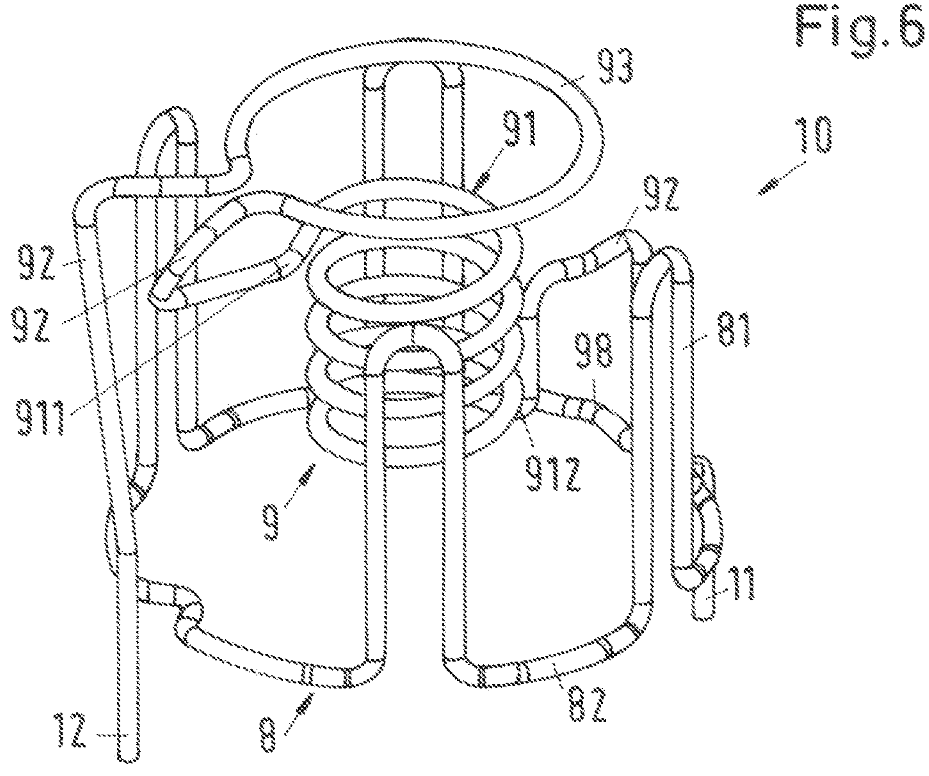
FIG. 6 illustrates a perspective view of the cooling device of the third embodiment.

FIG. 5 shows a perspective view of a third embodiment of a rotary drive 1 according to the disclosure. A segment is cut out of the stator 2 in FIG. 5, so that the interior of the space surrounded by the coil cores 25 can be seen. For better understanding, FIG. 6 shows the cooling device 10 of the third embodiment in a perspective view.

In the following, only the differences from the first and second embodiment will be looked at. The same parts or parts equivalent in function of the third embodiment are designated with the same reference signs as in the first and second embodiment. In particular, the reference signs have the same meaning as already explained in connection with the first and second embodiment. It is understood that all previous explanations of the first and second embodiment also apply in the same way or in the analogously same way to the third embodiment.

In the third embodiment, the cooling device 10 comprises a first ring conduit 93 through which the cooling fluid can flow, wherein the first ring conduit 93 extends in the circumferential direction radially inwardly along the longitudinal legs 26 of the coil cores 25, and wherein the first ring conduit 93 is arranged with respect to the axial direction A between the first circuit board 71 and the transverse legs 27. Thus, according to the representation (FIG. 5), the first ring conduit 93 is arranged above the first circuit board 71.

The first ring conduit 93 is designed in a substantially circular shape and runs in a plane that is parallel to the radial plane E. In particular, heat can be dissipated from that region in which the first circuit board 71 with its electronic components is arranged by the first ring line 93. This heat is generated, for example, during operation of the rotary drive 1 by the flow of electrical currents in the first circuit board 71 and by the copper losses and iron losses in the rotary drive 1.

Furthermore, in such applications where fluids with very high temperatures are conveyed or mixed with the rotary drive 1, heat is additionally introduced from the fluid into the electromagnetic rotary drive. Since the first circuit board 71 is located in the vicinity of the rotor 3, a considerable heat input from the fluid into the first circuit board 71 can be caused when conveying or mixing very hot fluids. In such applications, the first ring conduit 93 is particularly advantageous because it can be used to selectively dissipate heat from the region in which the first circuit board 71 is arranged.

Preferably, the first ring conduit 93 is an integral part of the second cooling conduit and is arranged in series with the cooling spiral 91. In contrast to the second embodiment, the second cooling conduit 9 thus additionally comprises the first ring conduit 93 in the third embodiment.

In terms of flow, the first ring conduit 93 is preferably arranged between the first end 911 of the cooling spiral 91 and the second cooling connection 12. The second cooling connection 12 is connected to one end of the first ring conduit 93 via a connecting segment 92 of the second cooling conduit 9. The other end of the first ring conduit 93 is connected to the first end 911 of the cooling spiral 9 via a further connecting segment 92 of the second cooling conduit 9.

In the operating state, the cooling fluid is fed through one of the two cooling connections 11, 12, for example, through the first cooling connection 11, flows through the first cooling conduit 8 with the cooling loops 81, then flows through the connecting element 98 into the second cooling conduit 9, flows through the cooling spiral 91, subsequently through the first ring conduit 93 and, after flowing through the second cooling conduit 9, flows out through the second cooling connection 12.

As an alternative or in addition to the first ring conduit 93, a second ring conduit 94 (FIG. 11) can also be provided, through which the cooling fluid can flow, wherein the second ring conduit 94 also extends in the circumferential direction radially inwardly along the longitudinal legs 26 of the coil cores 25, and wherein the second ring conduit 94 is arranged with respect to the axial direction between the first circuit board 71 and the windings 61*b*. The second ring conduit 94 is not represented in FIG. 5 but can be designed and arranged in an analogously same way, as will be explained in connection with FIG. 11.

According to the representation in FIG. 5, the second ring conduit 94 (not represented) is then arranged below the first circuit board 71 and directly adjacent to the first circuit board 71. The second ring conduit 94 is designed in a substantially circular shape and runs in a plane that is parallel to the radial plane E.

Preferably, the second ring conduit 94 is an integral part of the second cooling conduit 9 and is arranged in series with the cooling spiral 91.

Embodiments are possible in which either the first ring conduit 93 or the second ring conduit 94 is provided, but embodiments are also possible in which the cooling device 10 has the first ring conduit 93 and the second ring conduit 94.

Figure 7:
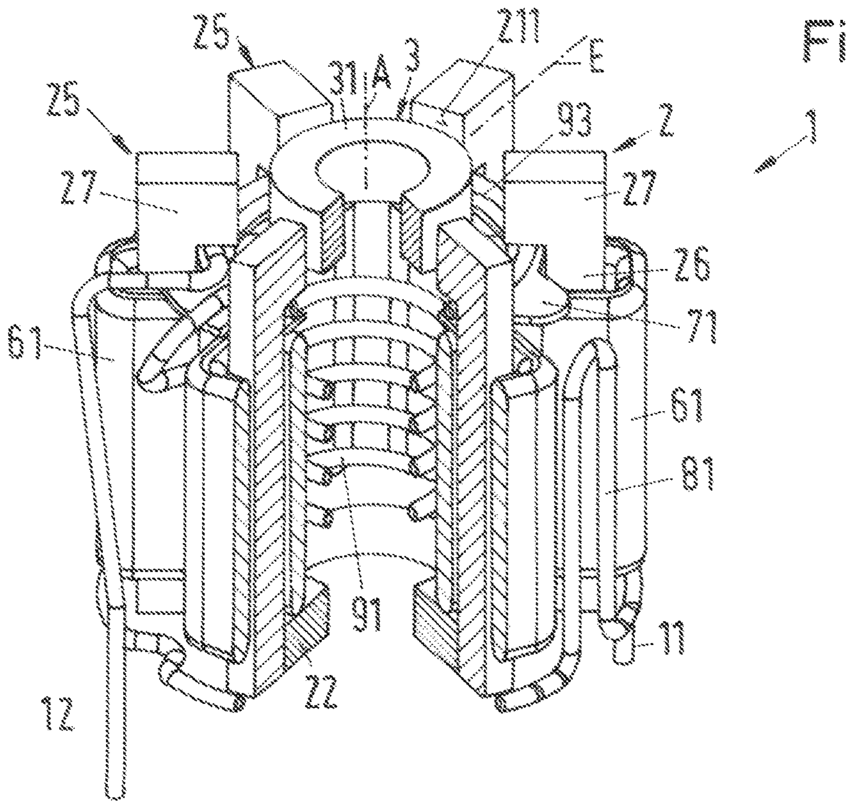
FIG. 7 illustrates a perspective view of a variant of the third embodiment, partly in section.

FIG. 7 shows a variant of the third embodiment in a perspective view as FIG. 5. In this variant, the drive function and bearing function is generated with only one single winding system, namely with the concentrated windings 61, so that there is therefore no distinction between drive coils and control coils.

The winding system is designed in such a way that exactly one concentrated winding 61 is wound in each case around each longitudinal leg 26. In the operating state, those electromagnetic rotating fields are generated with these concentrated windings 61 with which a torque is effected on the rotor 3 and with which an arbitrarily adjustable transverse force can be exerted on the rotor 3 in the radial direction, so that the radial position of the rotor 3, i.e. its position in the radial plane E perpendicular to the axial direction A, can be actively controlled or regulated. This can be realized in such a way that the values for the drive current and the control current determined in each case by a control device are mathematically added or superimposed—that is e.g., with the aid of software—and the resulting total current is impressed into the respective concentrated winding 61. In this case, of course, it is no longer possible to distinguish between control coils and drive coils. In the variant shown in FIG. 7, there is no distinction between drive coils and control coils in the stator 2, but there is only one winding system in each case, in whose six concentrated windings 61 the mathematically determined sum of the drive current and control current is impressed.

It is understood that the first embodiment (FIG. 1) and the second embodiment (FIG. 3) can also be designed in an analogous way to the variant represented in FIG. 7, i.e., with exactly one concentrated winding 61 at each longitudinal leg 26 instead of the separate drive coils 61*a* and the separate control coils 61*b*.

Figure 8:
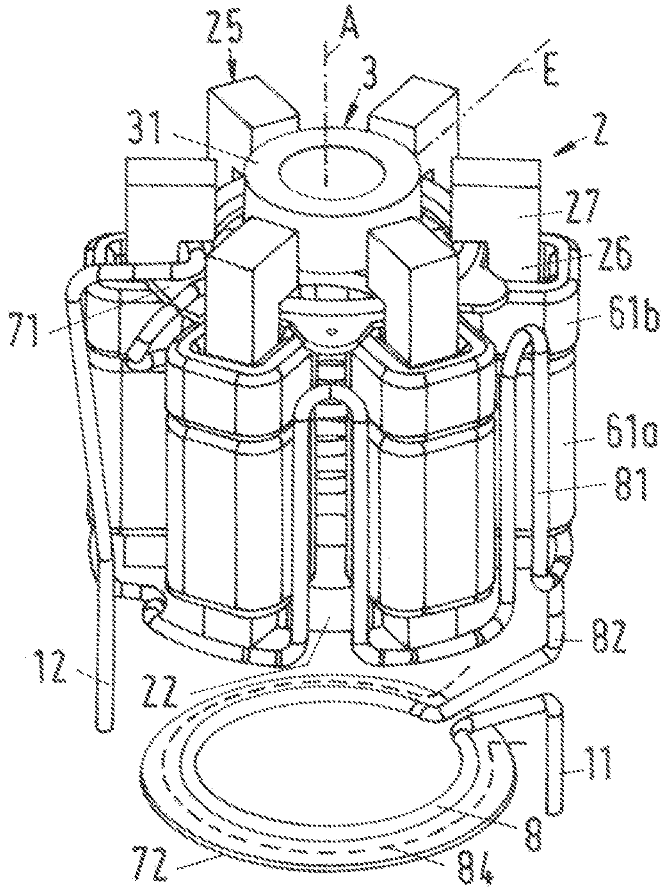
FIG. 8 illustrates a perspective view of a fourth embodiment of an electromagnetic rotary drive according to the disclosure.
Figure 9:
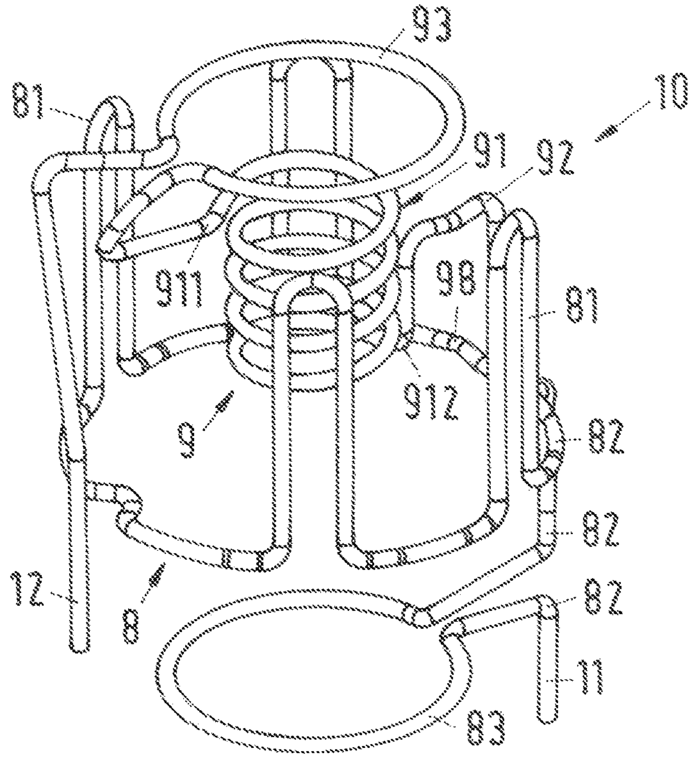
FIG. 9 illustrates a perspective view of the cooling device of the fourth embodiment.

FIG. 8 shows a perspective view of a fourth embodiment of a rotary drive 1 according to the disclosure. For better understanding, FIG. 9 shows the cooling device 10 of the fourth embodiment in a perspective view.

In the following, only the differences from the previously described embodiments will be looked at. The same parts or parts equivalent in function of the fourth embodiment are designated with the same reference signs as in the previously described embodiments. In particular, the reference signs have the same meaning as already explained in connection with the previously described embodiments and variants. It is understood that all previous explanations of the embodiments and variants also apply in the same way or in the analogously same way to the fourth embodiment.

In the fourth embodiment, the cooling device 10 comprises a third ring conduit 83, through which the cooling fluid can flow, and which primarily serves to cool a second circuit board 72 that has electronic components. The electronic components are not represented in FIG. 8. Preferably, the second circuit board 72 is designed as an electronic print or PCB (printed circuit board).

The second circuit board 72 is designed substantially in a disk-shaped manner and is arranged parallel to the radial plane E. With respect to the axial direction A, the second circuit board 72 is arranged adjacent to the first ends of the longitudinal legs 26 on the side of the first ends facing away from the transverse legs 27. According to the representation in FIG. 8, the second circuit board is below the first ends of the longitudinal legs 26 and thus also below the back iron 22.

For example, the control device for the rotary drive 1 can be arranged on the second circuit board 72, which can comprise the power electronics for controlling the windings 61 or 61*a*, 61*b* and for generating the electromagnetic fields, the control device for the drive and the levitation of the rotor and, if necessary, sensors or evaluation units. The second circuit board 72 is arranged in the stator housing 20 and is completely enclosed by the stator housing 20.

The third ring conduit 83 extends in the circumferential direction along the first ends of the longitudinal legs 26 and is arranged with respect to the axial direction A between the second circuit board 72 and the first ends of the longitudinal legs 26 or the back iron 22. According to the representation (FIG. 8), the third ring conduit 83 is thus arranged above the second circuit board 72.

As an alternative or in addition to the third ring conduit 83, a fourth ring conduit 84 can also be provided, which is only indicated by a dashed line in FIG. 8. The cooling fluid can also flow through the fourth ring conduit 84. The fourth ring conduit 84 extends in the circumferential direction and is arranged parallel to the radial plane E. With respect to the axial direction A, the fourth ring conduit 84 is arranged in such a way that the second circuit board 72 is located between the first ends of the longitudinal legs 26 and the fourth ring conduit 84 with respect to the axial direction A. With reference to the representation in FIG. 8, the fourth ring conduit 84 is arranged below the second circuit board 72.

Embodiments are possible in which either the third ring conduit 83 or the fourth ring conduit 84 is provided, but embodiments are also possible in which the cooling device 10 has the third ring conduit 83 and the fourth ring conduit 84.

The third ring conduit 83 and the fourth ring conduit are each designed in a substantially circular manner, and each extend in a plane that is parallel to the radial plane E and parallel to the back iron 22, respectively.

Preferably, the third ring conduit 83 and/or the fourth ring conduit 84 is/are integral part(s) of the first cooling conduit 8 and are each arranged in series with the cooling loops 81. In contrast to the previously described embodiments, in the fourth embodiment the first cooling conduit 8 thus additionally comprises the third ring conduit 83 and/or the fourth ring conduit 84.

In embodiments in which both the third ring conduit 83 and the fourth ring conduit 84 are provided, the third ring conduit 83 and the fourth ring conduit 84 are preferably arranged in series—i.e., one behind the other.

Preferably, the third ring conduit 83 and/or the fourth ring conduit 84 are arranged between the first cooling connection 11 and the cooling loops 81 in terms of flow. The first cooling connection 11 is connected to one end of the third ring conduit 83 or the fourth ring conduit 84 via a connecting segment 82 of the first cooling conduit 8. The second end of the third ring conduit 83 is connected to one of the cooling loops 81 via a further connecting segment 82 of the first cooling conduit 8.

In the operating state, the cooling fluid is fed through one of the two cooling connections 11, 12, for example through the first cooling connection 11, flows first through the fourth ring conduit 84 and/or the third ring conduit 83, then through the cooling loops 81 of the first cooling conduit 8, flows subsequently through the connecting element 98 into the second cooling conduit 9, flows through the cooling spiral 91 and the first ring conduit 93, and after flowing through the second cooling conduit 9, flows off through the second cooling connection 12.

Figure 10:
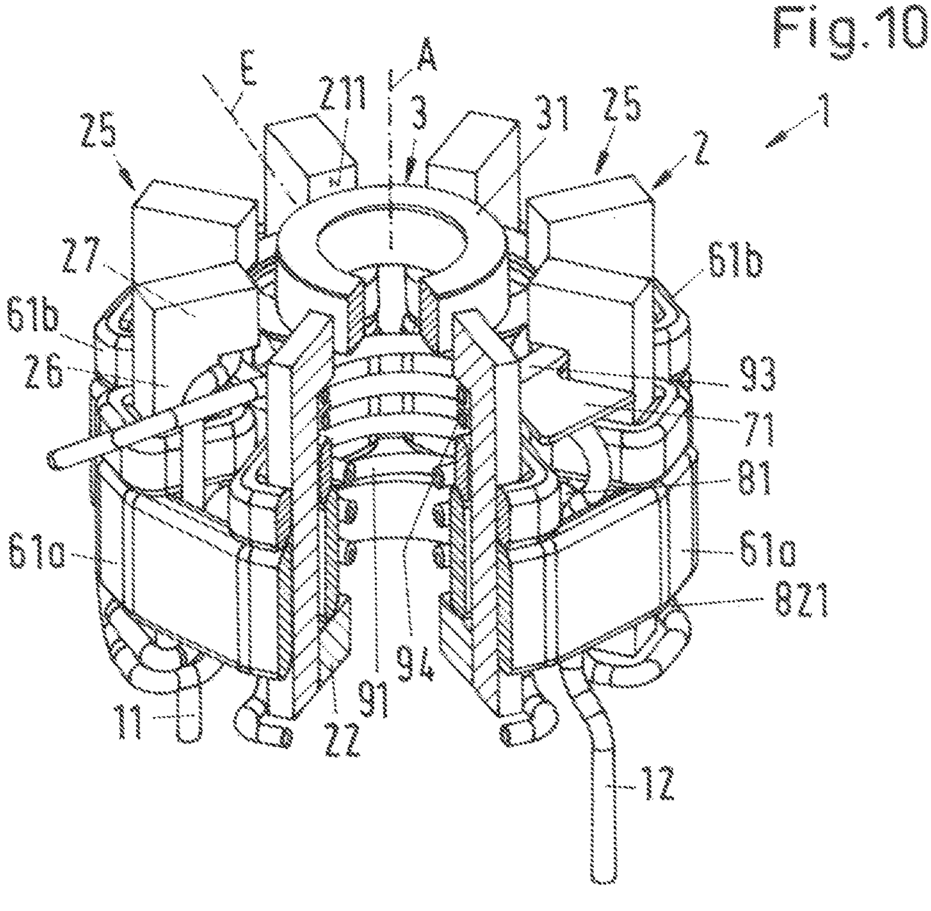
FIG. 10 illustrates a perspective view of a fifth embodiment of an electromagnetic rotary drive according to the disclosure, partly in section.
Figure 11:
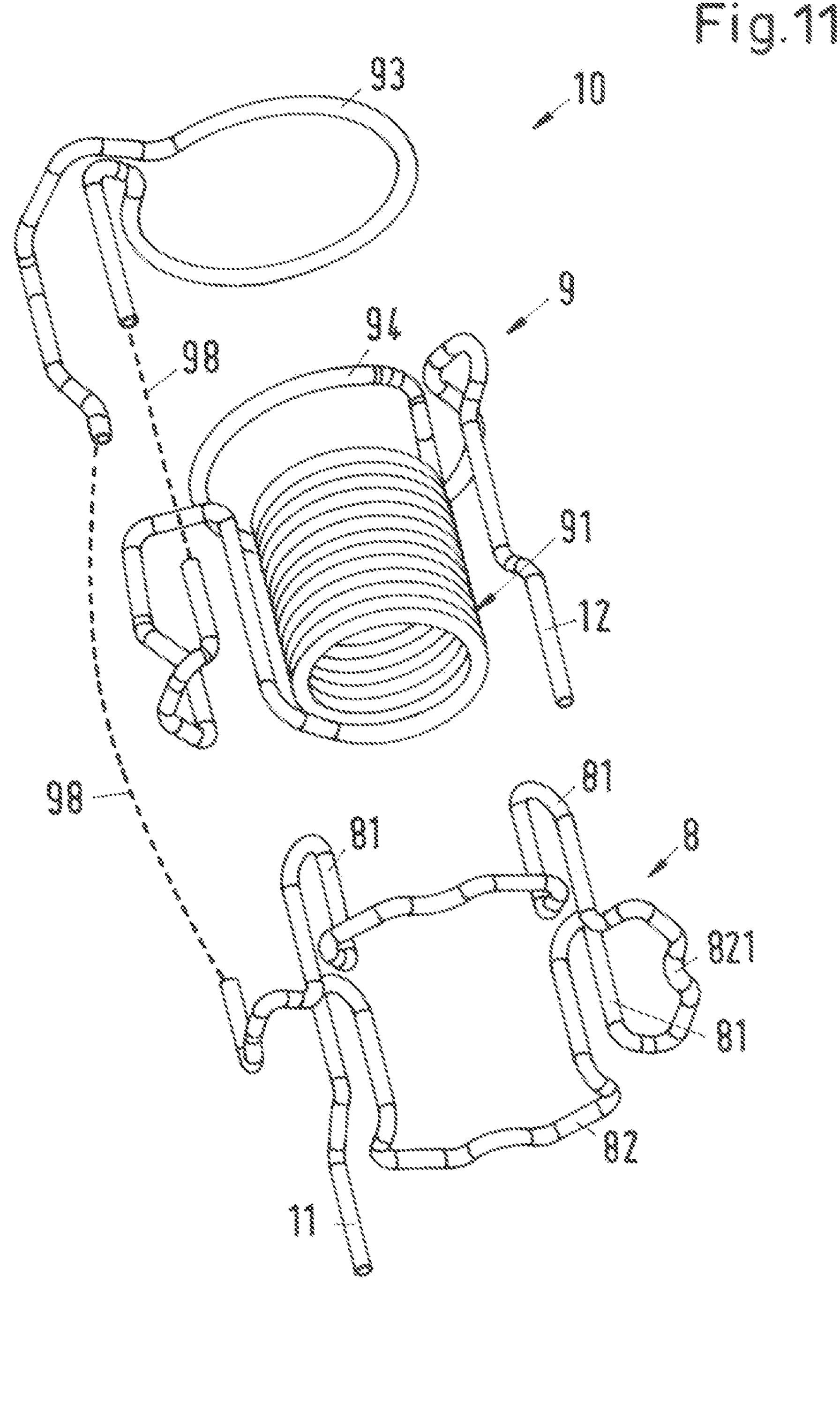
FIG. 11 illustrates a perspective view of the cooling device of the fifth embodiment in an exploded view.

FIG. 10 shows a perspective view of a fifth embodiment of a rotary drive 1 according to the disclosure. In FIG. 10, a segment is cut out of the stator 2 so that the interior of the space surrounded by the coil cores 25 can be recognized. FIG. 11 shows the cooling device 10 of the fifth embodiment in a perspective view. For better understanding, FIG. 11 shows the cooling device 10 in an exploded view.

In the following, only the differences from the previously described embodiments will be looked at. The same parts or parts equivalent in function of the fifth embodiment are designated with the same reference signs as in the previously described embodiments. In particular, the reference signs have the same meaning as already explained in connection with the previously described embodiments and variants. It is understood that all previous explanations of the embodiments and variants also apply in the same way or in the analogously same way to the fifth embodiment.

In the fifth embodiment, the stator 2 of the electromagnetic rotary drive 1 has eight coil cores 25, which are arranged circularly and equidistantly around the rotor 3. In the fifth embodiment, separate drive coils 61*a* and separate control coils 61*b* are provided at the longitudinal legs 26 of the coil cores 25.

The stator 2 comprises a plurality of concentrated drive coils 61*a*, in this case namely four drive coils 61*a*, each of which is arranged in each case around the longitudinal legs 26 of two adjacent coil cores 25, so that these two longitudinal legs 26 are arranged within the drive coil 61*a* with respect to the radial direction. Each drive coil 61*a* is thus wound around exactly two longitudinal legs 26 in each case, so that both longitudinal legs 26 are arranged in the interior of this drive coil 61*a*.

Furthermore, exactly one control coil 61*b* is provided at each of the longitudinal legs 26 in each case, which is arranged around the respective longitudinal leg 26. With respect to the axial direction A, the control coils 61*b* are arranged adjacent to the drive coils 61*a*, namely here (FIG. 10) above the drive coils according to the representation.

In the fifth embodiment, the cooling device 10 comprises the first cooling conduit 8 and the second cooling conduit 9.

The first cooling conduit 8 comprises the four cooling loops 81 and the connecting segments 82. The connecting segments 82, which connect two cooling loops 81 to one another, can have indentations 821 that are oriented radially inwardly and are arranged in the circumferential direction between the first ends of two adjacent longitudinal legs 26. The indentations 821 primarily serve to bring the first cooling conduit 8 closer to the back iron 22, thereby further enhancing heat dissipation.

Each of the cooling loops 81 is arranged within one of the drive coils 61*a* with respect to the radial direction. The advantage of arranging the cooling loops 81 in each case in the inner space of one of the drive coils is that in particular the heat generated by the copper losses can be dissipated particularly efficiently.

In the fifth embodiment, such variants are also possible in which the first cooling conduit 8 additionally comprises the third ring conduit 83 for cooling the second circuit board 72, in analogously the same way as described for the fourth embodiment.

The second cooling conduit 9 comprises the cooling spiral 91, the first ring conduit 93, which is arranged between the first circuit board 71 and the transverse legs 27 with respect to the axial direction A, and the second ring conduit 94, which is arranged between the first circuit board 71 and the windings 61*b* with respect to the axial direction A. In this embodiment, the second cooling conduit 9 thus comprises both the first ring conduit 93, which is provided above the first circuit board 71 according to the representation (FIG. 10), and the second ring conduit 94, which is arranged below the first printed circuit board 71 according to the representation.

It is understood that for the fifth embodiment, such variants are also possible in which the first ring conduit 93 but not the second ring conduit 94 is provided, or such variants in which the second ring conduit 94 but not the first ring conduit 93 is provided, or such variants in which the second cooling conduit 9 has neither the first ring conduit 93 nor the second ring conduit 94.

In the cooling device 10, the first cooling conduit 8 is preferably designed in one piece. For constructional reasons, it can be advantageous to assemble the second cooling conduit 9—as shown in FIG. 11—from two individual pieces, wherein one individual piece comprises the cooling spiral 91 and the second ring conduit 94, and the other individual piece comprises the first ring conduit 93. Then, these two individual pieces can be connected to each other via a connecting element 98, wherein the connecting element can be designed in an analogous manner as explained in connection with the second embodiment (FIG. 3, FIG. 4).

The second cooling conduit 9 is in turn connected to the first cooling conduit 8 via the connecting element 98. Due to the exploded view in FIG. 11, the connecting elements 98 are indicated in each case there only by the dashed lines with the reference sign 98.

In the operating state, the cooling fluid is fed through one of the two cooling connections 11, 12, for example through the first cooling connection 11, first flows through the cooling loops 81 of the first cooling conduit 8, flows subsequently through the connecting element 98 into the second cooling conduit 9, flows through the first ring conduit 93, then the cooling spiral 91 and the second ring conduit 94, and after flowing through the second cooling conduit 9, flows off through the second cooling connection 12.

In terms of flow, in the second cooling conduit, the cooling spiral 91 is thus arranged between the first ring conduit 93 and the second ring conduit 94.

Furthermore, a centrifugal pump 100 for conveying a fluid is proposed by the disclosure, which is characterized in that the centrifugal pump 100 comprises an electromagnetic rotary drive 1 designed according to the disclosure, wherein the rotor 3 of the electromagnetic rotary drive 1 is designed as the rotor 3 of the centrifugal pump 100.

Figure 12:
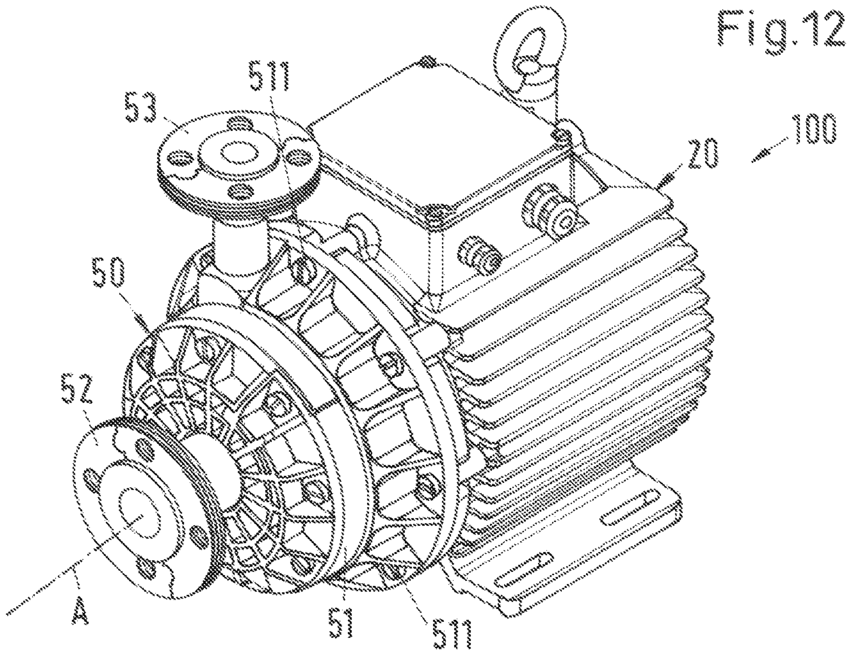
FIG. 12 illustrates a perspective view of an embodiment of a centrifugal pump according to the disclosure.
Figure 13:
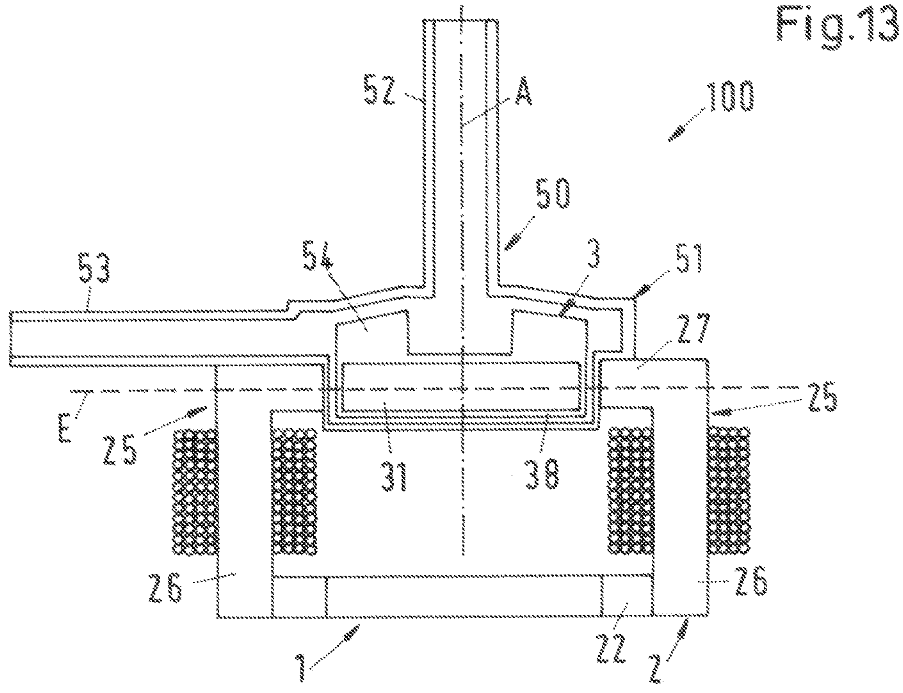
FIG. 13 illustrates a schematic sectional view of the embodiment from FIG. 12 in a section in the axial direction.

FIG. 12 shows an embodiment of a centrifugal pump according to the disclosure, which is designated in its entirety by the reference sign 100, in a perspective view. For better understanding, FIG. 13 shows a schematic sectional view of the embodiment from FIG. 12 in a section in the axial direction A. In FIG. 13, the stator housing 20 and the cooling device 11 are not represented for better understanding.

The centrifugal pump 100 comprises a pump unit 50 with a pump housing 51, which comprises an inlet 52 and an outlet 53 for the fluid to be conveyed, wherein the rotor 3 is arranged in the pump housing 51 and comprises a plurality of vanes 54 for conveying the fluid. The pump unit 50 is designed in such a way that the pump unit 50 can be inserted into the stator 2 such that the magnetically effective core 31 of the rotor 3 is surrounded by the end faces 211 of the transverse legs 27.

It is an advantageous aspect that the rotor 3 is designed as an integral rotor, because it is both the rotor 3 of the electromagnetic rotary drive 1 and the rotor 3 of the centrifugal pump 100 with which the fluid is conveyed. Altogether, the rotor 3 thus fulfills three functions in one: it is the rotor 3 of the electromagnetic drive 1, it is the rotor 3 of the magnetic levitation, and it is the impeller with which the fluid or fluids are acted upon. This design as an integral rotor offers the advantage of a very compact and space-saving design.

The stator 2 is arranged in the stator housing 20, which is preferably designed as a hermetically sealed stator housing 20 and encapsulates the stator 2. If the rotary drive 1 is designed with the first circuit board 71, this is also arranged in the stator housing 20. If the rotary drive 1 is designed with the second circuit board 72, this is preferably, but not necessarily, also arranged in the stator housing 20. The stator housing 20 is preferably filled with a casting compound, for example with an epoxy resin or with a polyurethane, so that the stator 2 and possibly further components arranged inside the stator housing 20 are surrounded by the casting compound.

The stator housing 20 also has a recess at its end facing the pump unit 50, so that the pump unit 50 can be inserted into this recess. The rotor 3 provided in the pump housing 51 is then enclosed by this recess in the stator housing 20, wherein the magnetically effective core 31 of the rotor 3 is arranged between the transverse legs 27 of the coil cores 26.

The pump housing 51 is fixed to the stator housing 20, preferably with a plurality of screws 511.

The cooling connections 11, 12 are preferably provided at the side of the stator housing 20 facing away from the pump unit 50 and can therefore not be recognized in FIG. 12.

The rotor 3 comprises the plurality of vanes 54 for conveying the fluid. In the embodiment described here, for example, a total of four vanes 54 is provided, whereby this number has an exemplary character. The rotor 3 further comprises a jacket 38 with which the magnetically effective core 31 of the rotor 3 is enclosed and preferably hermetically encapsulated so that the magnetically effective core 31 of the rotor 3 does not come into contact with the fluid to be conveyed. All vanes 54 are arranged on the jacket 38 and arranged equidistantly with respect to the circumferential direction of the rotor 3. Each vane 54 extends outward in the radial direction and is connected to the jacket 38 in a torque-proof manner. The vanes 54 can be separate components that are then fixed to the jacket 38. Of course, it is also possible that all of the vanes 54 are an integral part of the jacket 38, i.e., that the jacket 38 is designed with all of the vanes 54 in one piece. The rotor 3 with the vanes 54 forms the wheel or the impeller of the centrifugal pump 100, with which the fluid or fluids are acted upon.

Depending on the application, it is preferred if the pump housing 51 of the pump unit 50 as well as the jacket 38 and the vanes 54 are made of one or more plastics. Suitable plastics are: polyethylene (PE), low density polyethylene (LDPE), ultra low density polyethylene (ULDPE), ethylene vinyl acetate (EVA), polyethylene terephthalate (PET), polyvinyl chloride (PVC), polypropylene (PP), polyurethane (PU), polyvinylidene fluoride (PVDF), acrylonitrile butadiene styrene (ABS), polyacrylic, polycarbonates (PC), polyetheretherketone (PEEK) or silicones. For many applications, the materials known under the brand name Teflon, polytetrafluoroethylene (PTFE) and perfluoroalkoxy polymers (PFA), are also suitable as plastic.

It is understood that the electromagnetic rotary drive according to the disclosure is also suitable for devices other than centrifugal pumps, for example for mixing devices for mixing flowable substances, for stirring devices, for example for mixing a fluid in a tank, for fans or also for devices for carrying and rotating wafers, for example in semiconductor manufacturing.

What is claimed is:

1. An electromagnetic rotary drive, which is designed as a temple motor, comprising:

a rotor comprising a ring-shaped or disc-shaped magnetically effective core;

a stator, which is a bearing and drive stator, with which the rotor is capable of being magnetically driven without contact in an operating state about a desired axis of rotation, which defines an axial direction, and with which the rotor is capable of being magnetically levitated without contact with respect to the stator, the rotor being actively magnetically levitated in a radial plane perpendicular to the axial direction, the stator having a plurality of coil cores, each coil core of the plurality of coil cores comprising a longitudinal leg extending from a first end to a second end in the axial direction, and a transverse leg arranged at the second end of the longitudinal leg in a radial plane and extending from the longitudinal leg in a radial direction, the plurality of coil cores arranged around the magnetically effective core with respect to a circumferential direction, and for each coil core of the plurality of coil cores, at least one concentrated winding is provided on the longitudinal leg, and surrounds the longitudinal leg; and a cooling device comprising a first cooling conduit through which a cooling fluid is capable of flowing, the first cooling conduit having a cooling conduit section arranged with respect to the circumferential direction in an interspace between the longitudinal legs of two adjacent coil cores and extending in the axial direction.

2. The electromagnetic rotary drive according to claim 1, wherein the first cooling conduit has a cooling loop, arranged with respect to the circumferential direction in an interspace between the longitudinal legs of two adjacent coil cores, and the cooling conduit section is part of the cooling loop.

3. The electromagnetic rotary drive according to claim 2, wherein the first cooling conduit has a plurality of cooling loops and connecting segments for connecting adjacent cooling loops, each of the connecting segments extending in the circumferential direction and arranged radially outwardly adjacent the first ends of the longitudinal legs of the coil cores.

4. The electromagnetic rotary drive according to claim 3, wherein the connecting segments extend in the circumferential direction between two cooling loops and radially adjacent a back iron or the first end of each of the longitudinal legs.

5. The electromagnetic rotary drive according to claim 1, wherein the first end of each of the longitudinal legs is connected by a back iron to guide magnetic flux, and the first cooling conduit extends region-wise adjacent to the back iron.

6. The electromagnetic rotary drive according to claim 1, wherein the cooling device comprises a second cooling conduit through which the cooling fluid is capable of flowing, the second cooling conduit has an inner space loop arranged radially inwardly with respect to the winding for each coil core of the plurality of coil cores in the inner space surrounded by the winding for each coil core of the plurality of coil cores.

7. The electromagnetic rotary drive according to claim 6, wherein the first cooling conduit and the second cooling conduit are connected in series.

8. The electromagnetic rotary drive according to claim 6, wherein the inner space loop is a cooling spiral.

9. The electromagnetic rotary drive according to any claim 1, wherein, with respect to the axial direction, a first circuit board with electronic components is arranged between the winding and the transverse leg for each coil core of the plurality of coil cores, and cooling device comprises a first ring conduit or a second ring conduit, through each of which the cooling fluid is capable of flowing, the first ring conduit or the second ring conduit extending in the circumferential direction radially inwardly along the longitudinal legs of the coil cores, the first ring conduit is arranged with respect to the axial direction between the first circuit board and the transverse leg for each coil core of the plurality of coil cores, and the second ring conduit is arranged with respect to the axial direction between the first circuit board and the winding for each coil core of the plurality of coil cores.

10. The electromagnetic rotary drive according to claim 9, wherein the cooling device has the first ring conduit and the second ring conduit.

11. The electromagnetic rotary drive according to claim 9, wherein the first ring conduit or the second ring conduit is an integral part of a second cooling conduit and is connected in series with an inner space loop and a cooling spiral, respectively.

12. The electromagnetic rotary drive according to claim 9, further comprising a second circuit board with electronic components arranged with respect to the axial direction adjacent to the first end of the longitudinal leg for each coil core of the plurality of coil cores on the side facing away from a transverse leg, and the cooling device comprising a third ring conduit or a fourth ring conduit, through which the cooling fluid is capable of flowing, the third ring conduit or the fourth ring conduit extending in the circumferential direction, the third ring conduit is arranged with respect to the axial direction between the second circuit board and the first end of the longitudinal leg for each coil core of the plurality of coil cores, and wherein the fourth ring conduit is arranged such that the second circuit board is located with respect to the axial direction between the first end of the longitudinal leg for each coil core of the plurality of coil cores and the fourth ring conduit.

13. The electromagnetic rotary drive according to claim 12, wherein the third ring conduit or the fourth ring conduit is an integral part of the first cooling conduit and are connected in series with the at least one cooling loop.

14. The electromagnetic rotary drive according to claim 9, wherein the first ring conduit and the second ring conduit are an integral part of a second cooling conduit and are connected in series with an inner space loop and a cooling spiral, respectively.

15. The electromagnetic rotary drive according to claim 1, wherein the at least one concentrated winding includes two concentrated windings provided at the longitudinal leg for each coil core of the plurality of coil cores, each of the two concentrated windings surrounding a respective longitudinal leg, and arranged adjacent to each other with respect to the axial direction.

16. The electromagnetic rotary drive according to claim 1, further comprising a plurality of concentrated drive coils, each concentrated drive coil of the plurality of concentrated drive coils is arranged around the longitudinal legs of two adjacent coil cores, such that the longitudinal legs of the of two adjacent coil cores are arranged within the drive coil with respect to the radial direction.

17. The electromagnetic rotary drive according to claim 16, wherein the cooling conduit section or a cooling loop is arranged within one of the drive coils with respect to the radial direction.

18. A centrifugal pump for conveying a fluid, comprising:

an electromagnetic rotary drive according to claim 1, the rotor of the electromagnetic rotary drive being the rotor of the centrifugal pump.

19. The electromagnetic rotary drive according to claim 1, further comprising a plurality of concentrated coils wherein the cooling conduit section is arranged with respect to the circumferential direction between two adjacent concentrated coils and extending in the axial direction.

20. The electromagnetic rotary drive according to claim 19, wherein a portion of the cooling loop extends in the circumferential direction radially adjacent a back iron.

* * * * *